United States Patent
Liu et al.

(10) Patent No.: US 11,929,462 B2
(45) Date of Patent: Mar. 12, 2024

(54) STABLE, NON-CORROSIVE ELECTROLYTE WITH HIGH PERFORMANCE FOR RECHARGEABLE ION BATTERIES

(71) Applicants: Tianbiao Liu, Logan, UT (US); Jian Luo, Logan, UT (US); Liping Zhang, Logan, UT (US)

(72) Inventors: Tianbiao Liu, Logan, UT (US); Jian Luo, Logan, UT (US); Liping Zhang, Logan, UT (US)

(73) Assignee: Utah State University, Logan, UT (US)

( * ) Notice: Subject to any disclaimer, the term of this patent is extended or adjusted under 35 U.S.C. 154(b) by 195 days.

(21) Appl. No.: 17/153,209

(22) Filed: Jan. 20, 2021

(65) Prior Publication Data
US 2021/0226255 A1    Jul. 22, 2021

Related U.S. Application Data

(60) Provisional application No. 62/963,794, filed on Jan. 21, 2020.

(51) Int. Cl.
| | |
|---|---|
| H01M 10/0568 | (2010.01) |
| H01M 4/133 | (2010.01) |
| H01M 4/134 | (2010.01) |
| H01M 4/136 | (2010.01) |
| H01M 10/054 | (2010.01) |
| H01M 10/0569 | (2010.01) |
| H01M 4/02 | (2006.01) |

(52) U.S. Cl.
CPC ....... *H01M 10/0568* (2013.01); *H01M 4/133* (2013.01); *H01M 4/134* (2013.01); *H01M 4/136* (2013.01); *H01M 10/054* (2013.01); *H01M 10/0569* (2013.01); *H01M 2004/027* (2013.01); *H01M 2004/028* (2013.01); *H01M 2300/0028* (2013.01); *H01M 2300/0045* (2013.01)

(58) Field of Classification Search
None
See application file for complete search history.

(56) References Cited

U.S. PATENT DOCUMENTS

| | | | |
|---|---|---|---|
| 8,722,242 | B2 | 4/2014 | Muldoon et al. |
| 8,993,178 | B2 | 3/2015 | Nakayama et al. |
| 9,012,072 | B2 | 4/2015 | Aurbach et al. |

(Continued)

FOREIGN PATENT DOCUMENTS

| | | | |
|---|---|---|---|
| CN | 101771166 | * | 7/2010 |
| EP | 2169755 | | 3/2010 |
| WO | WO 2017/180285 | * | 10/2017 |

OTHER PUBLICATIONS

Luo et al., "A Stable, Non-Corrosive Perfluorinated Pinacolatoborate Mg Electrolyte for Rechargeable Mg Batteries", 131 Angew. Chem. 7041-7045 (2019).

(Continued)

*Primary Examiner* — Laura Weiner
(74) *Attorney, Agent, or Firm* — Michael Best & Friedrich LLP

(57) ABSTRACT

Described herein are compounds and compositions for electrolytes based on bidentate and monodentate fluorinated alcohols. Also described are batteries that include the compounds and electrolytes described herein.

13 Claims, 35 Drawing Sheets
(18 of 35 Drawing Sheet(s) Filed in Color)

(56) References Cited

U.S. PATENT DOCUMENTS

| | | | |
|---|---|---|---|
| 9,077,032 B2 | 6/2015 | Doe et al. | |
| 10,147,970 B2 | 12/2018 | Muldoon et al. | |
| 2011/0111286 A1* | 5/2011 | Yamamoto | H01M 4/38 |
| | | | 429/188 |
| 2020/0091556 A1* | 3/2020 | Lau | H01M 10/0569 |

OTHER PUBLICATIONS

Li et al., "Towards stable and efficient electrolytes for room-temperature rechargeable calcium batteries", Energy & Environmental Science, 2019, vol. 12.

Herb et al., "A Fluorinated Alkoxyaluminate Electrolyte for Magnesium-Ion Batteries", ACS Energy Letters, 2016, pp. 1227-1232, vol. 1.

Zhao-Karger et al., "A new class of non-corrosive, highly efficient electrolytes for rechargeable magnesium batteries", Journal of Materials Chemistry A, 2017, pp. 10815-10820, vol. 5.

Luo et al., "A Stable, Non-Corrosive Perfluorinated Pinacolatoborate Mg Electrolyte for Rechargeable Mg Batteries", ChemRxiv (Feb. 13, 2019).

Brouillet et al., Dalton Trans., 2016, vol. 45, pp. 5590-5597.

Dunn et al., Science, 2011, vol. 334, pp. 928-935.

Guo et al., Energy Environ. Sci., 2012, vol. 5, pp. 9100-9106.

Hahn et al., J. Am. Chem. Soc., 2018, vol. 140, pp. 11076-11084.

Kim et al., Nat. Commun., 2011, vol. 2, p. 427.

Liu et al., J. Mater. Chem. A, 2014, vol. 2, pp. 3430-3438.

McArthur et al., Inorg. Chem. Front., 2015, vol. 2, pp. 1101-1104.

Pour et al., J. Am. Chem. Soc., 2011, vol. 133, pp. 6270-6278.

Tutusaus et al., Angew. Chem. Int. Ed., 2015, vol. 54, pp. 7900-7904.

Xu, Chem Rev, 2014, vol. 114, pp. 11503-11618.

Zhang et al., Adv. Energy Mater., 2017, vol. 7, 1602055.

Canepa et al., Odyssey of Multivalent Cathode Materials: Open Questions and Future Challenges, Chemical Reviews, Mar. 2017, 117(5):4287-4341.

Doe et al., "Novel, electrolyte solutions comprising fully inorganic salts with high anodic stability for rechargeable magnesium batteries", Chem. Commun., 2014, vol. 50, pp. 243-245.

He et al., "MgCl2/AlCl3 Electrolytes for Reversible Mg Deposition/Stripping: Electrochemical Conditioning or Not?," J. Mater. Chem. A, 2017, vol. 5, pp. 12718-12722.

Luo et al., "Tertiary Mg/MgCl2/AlCl3 Inorganic Mg2+ Electrolytes with Unprecedented Electrochemical Performance for Reversible Mg Deposition", ACS Energy Lett., 2017, vol. 2, pp. 1197-1202.

See et al., "The Interplay of Al and Mg Speciation in Advanced Mg Battery Electrolyte Solutions," J. Am. Chem. Soc., 2016, vol. 138, pp. 328-337.

Watkins et al., "Designer Ionic Liquids for Reversible Electrochemical Deposition/Dissolution of Magnesium," J. Am. Chem. Soc., 2016, vol. 138, pp. 641-650.

* cited by examiner

Mg-FPB•(DGM)$_2$

STABLE, NON-CORROSIVE ELECTROLYTE WITH HIGH PERFORMANCE FOR RECHARGEABLE ION BATTERIES

CROSS REFERENCE TO RELATED APPLICATIONS

This application claims priority to U.S. Provisional Patent Application No. 62/963,794, filed on Jan. 21, 2020, which is incorporated by reference herein in its entirety.

TECHNICAL FIELD

Described herein are compounds and compositions for electrolytes based on bidentate and monodentate fluorinated alcohols. Also described are batteries that include the compounds and electrolytes described herein.

BACKGROUND

Magnesium (Mg) batteries have received increased attention as promising battery systems alternative to Li ion, Li metal, and Na metal batteries for electrochemical energy storage. Mg batteries possess several attractive technical merits, being safe, environmentally benign, and inexpensive, while maintaining a high capacity and high reduction potential.

During the past few decades, a great effort has been made in developing reversible electrolytes, and their electrochemical performance has been remarkably improved. However, developing high performance and simple $Mg^{2+}$ electrolytes like those used in Li ion batteries remains challenging. The reported Mg electrolytes for Mg ion battery and Mg—S battery are mainly based on Grignard reagents and chloride ($Cl^-$) salts of magnesium and are either nucleophilic or corrosive for the metallic current collectors and other battery components. Some non-nucleophilic, Cl-free Mg electrolytes, such as $Mg(BH_4)_2$, $Mg(CB_{11}H_{12})_2$, and $Mg(PF6)_2$, have also been developed for Mg battery application but still pose challenges for widespread use. For example, the anodic stability of $Mg(BH_4)_2$ is only 1.7 V vs Mg, the preparation of $Mg(CB_{11}H_{12})_2$ is expensive and non-facile, and the electrochemical performance of $Mg(PF_6)_2$ electrolyte is poor.

There is a need, therefore, for new electrolytes which can deliver high electrochemical performance, have chemical compatibility with commonly used electrodes and battery components, are non-toxic and stable under ambient conditions, be readily, easily, and cost-effectively produced.

SUMMARY

Disclosed herein are novel compounds, electrolytes, and batteries. More specifically, disclosed herein are compounds formula (I):

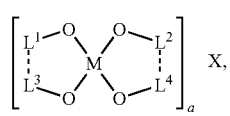

wherein:
(- - -) are optional bonds;
$L^1$, $L^2$, $L^3$, and $L^4$ are each $CR^1R^2R^3$;

each $R^1$, $R^2$, and $R^3$ are independently selected from H, F, a $C_1$-$C_{10}$ alkyl, a $C_1$-$C_{10}$ fluoroalkyl, and a phenyl that is optionally substituted with 1-5 substituents each independently selected from the group consisting of F, a $C_1$-$C_{10}$ alkyl, and a C1-C10 fluoroalkyl, with the proviso that each $R^3$ is absent when the optional bonds are present;
M is aluminum or boron;
a is 1 or 2; and
X is an alkali metal, an alkaline earth metal, or zinc.

Also disclosed are electrolytes comprising the compound of formula (I) and a solvent, and batteries comprising the electrolyte, a cathode, and an anode, wherein the anode comprises a metal selected from an alkali metal, an alkaline earth metal and zinc, where the metal is the same as X in the compound of formula (I).

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 7A is stainless steel, FIG. 7B is titanium, FIG. 7C is aluminum, FIG. 7D is magnesium, FIG. 7E is platinum, and FIG. 7F is molybdenum. Mg as reference and counter electrode, 50 mV/s scan rate.

DETAILED DESCRIPTION

Figure 1:
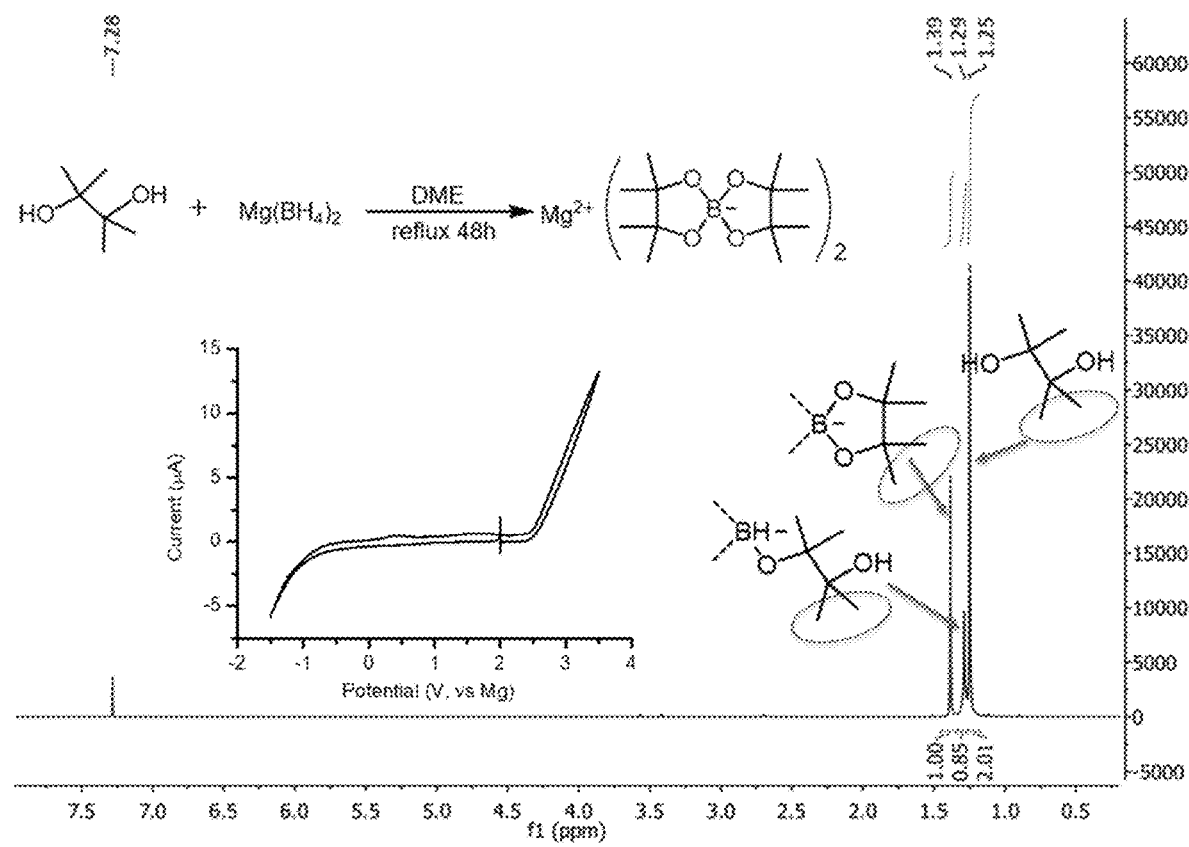
FIG. 1 is the $^1$H-NMR spectrum of the reaction between $Mg(BH_4)_2$ and pinacol (2,3-dimethyl-2,3-butanediol). Inset: Cyclic voltammetry (CV) curve of the corresponding solution in DGM.

Due to the high reactivity and corrosiveness of the Grignard reagents and chloride (Cl$^-$)-based Mg$^{2+}$ electrolytes in organic solvents, developing Mg$^{2+}$ electrolytes which deliver high electrochemical performance and are chemically compatible with the electrodes and the battery components remains challenging, thereby impeding the development of Mg-based batteries. Disclosed herein are newly designed alkali metal and alkaline earth metal salts, including but not limited to Mg salts, Mg-FPB, Mg—FPA, Mg-TFEB, Mg-HFMPB, and Mg-FTBB, synthesized by convenient methods from commercially available reagents. These electrolytes are capable of delivering significantly improved electrochemical performance and stability than the previously reported electrolytes. Specifically, the Mg-FPB electrolyte was shown to have 95% Coulombic efficiency, 197 mV overpotential, and −0.308V Mg deposition onset potential. The reliability of the Mg-FPB electrolyte in Mg ion battery was confirmed by the Mg/V$_2$O$_5$ battery and high voltage Mg/MnO$_2$ battery study. The Mg/V$_2$O$_5$ battery delivered 1.5 V voltage and 580 mAh·g$^{-1}$ discharge capacity, and the Mg/MnO$_2$ battery delivered 2.0 V battery voltage and 150 mAh·g$^{-1}$ discharge capacity. The FPB based ionic liquid, Pyr14-FPB, was further synthesized by ion exchange. And the Mg-FPB-Pyr14-FPB electrolyte was applied in the Mg—S and Mg—Se battery. The electrochemical performance of the Mg-HFMPB and Mg-FTBB electrolytes was studied by CV measurements. Mg-HFMPB delivered in displayed 71% Coulombic efficiency and 375 mV overpotential and the Mg-FTBB electrolyte, showed a similar level of performance was observed with 72% Coulombic efficiency and 409 mV overpotential.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March March's Advanced Organic Chemistry, 5$^{th}$ Ed., John Wiley & Sons, Inc., New York, 2001; Larock, Comprehensive Organic Transformations, VCH Publishers, Inc., New York, 1989; Carruthers, Some Modern Methods of Organic Synthesis, 3rd Ed., Cambridge University Press, Cambridge, 1987; the entire contents of each of which are incorporated herein by reference.

For compounds described herein, groups and substituents thereof may be selected in accordance with permitted valence of the atoms and the substituents, such that the selections and substitutions result in a stable compound, e.g., which does not spontaneously undergo transformation such as by rearrangement, cyclization, elimination, etc.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "alkali metal," as used herein, refers to the elements found in group 1 of the periodic table, including, lithium (Li), sodium (Na), potassium (K), rubidium (Rb), Cesium (Cs), and Francium (Fr).

The term "alkaline earth metal," as used herein, refers to the six elements in group 2 of the periodic table, including, beryllium (Be), magnesium (Mg), calcium (Ca), strontium (Sr), barium (Ba), and radium (Ra).

The term "alkyl," as used herein, means a straight or branched, saturated hydrocarbon chain. The term "$C_1$-$C_{10}$ alkyl" means a straight or branched chain hydrocarbon containing from 1 to 10 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "fluoroalkyl," as used herein, means an alkyl group, as defined herein, in which one or more of the hydrogen atoms are replaced by fluorine. Representative examples of fluoroalkyl include, but are not limited to, 2-fluoroethyl, 2,2,2-trifluoroethyl, trifluoromethyl, difluoromethyl, pentafluoroethyl, and trifluoropropyl such as 3,3, 3-trifluoropropyl.

The term "ionic liquid" or "IL" refers to a salt which melts at a relatively low temperature. An ionic liquid is essentially a salt in the liquid state. While ordinary liquids such as water and gasoline are predominantly made of electrically neutral molecules, ionic liquids are largely made of ions and ion pairs (i.e., cations and anions). The physical properties of an IL vary with the identity of the cation/anion species. Any salt that melts without decomposing or vaporizing can usually yield an ionic liquid. Sodium chloride (NaCl), for example, melts at 801° C. (1,474° F.) into a liquid that consists largely of sodium cations ($Na^+$) and chloride anions ($Cl^-$).

The term "substituents" refers to a group "substituted" for a hydrogen on any carbon atom of a particular chemical moiety. Any or all of the hydrogen atoms may be substituted. For example, "phenyl that is optionally substituted with 1-5 substituents" means that 1, 2, 3, 4 or 5 of the hydrogen atoms may be substituted with a defined substituent such that 1, 2, 3, 4 or 5 of the carbon atoms in the phenyl, respectively, are covalently attached to a defined substituent instead of a hydrogen.

The term "substituted" refers to a group that may be further substituted with one or more non-hydrogen substituents. Unless otherwise specified, substituents may include, but are not limited to, halogen, =O (oxo), =S (thioxo), cyano, nitro, fluoroalkyl, alkoxyfluoroalkyl, fluoroalkoxy, alkyl, alkenyl, alkynyl, haloalkyl, haloalkoxy, heteroalkyl, cycloalkyl, cycloalkenyl, aryl, heteroaryl, heterocycle, cycloalkylalkyl, heteroarylalkyl, arylalkyl, hydroxy, hydroxyalkyl, alkoxy, alkoxyalkyl, alkylene, aryloxy, phenoxy, benzyloxy, amino, alkylamino, acylamino, aminoalkyl, arylamino, sulfonylamino, sulfinylamino, sulfonyl, alkylsulfonyl, arylsulfonyl, aminosulfonyl, sulfinyl, —COOH, ketone, amide, carbamate, and acyl. For example, if a group is described as being "optionally substituted" (such as an alkyl, alkenyl, alkynyl, aryl, heteroaryl, cycloalkyl, heteroalkyl, heterocycle or other group such as an R group), it may have 0 or more substituents independently selected from halogen, =O (oxo), =S (thioxo), cyano, nitro, fluoroalkyl, alkoxyfluoroalkyl, fluoroalkoxy, alkyl, alkenyl, alkynyl, haloalkyl, haloalkoxy, heteroalkyl, cycloalkyl, cycloalkenyl, aryl, heteroaryl, heterocycle, cycloalkylalkyl, heteroarylalkyl, arylalkyl, hydroxy, hydroxyalkyl, alkoxy, alkoxyalkyl, alkylene, aryloxy, phenoxy, benzyloxy, amino, alkylamino, acylamino, aminoalkyl, arylamino, sulfonylamino, sulfinylamino, sulfonyl, alkylsulfonyl, arylsulfonyl, aminosulfonyl, sulfinyl, —COOH, ketone, amide, carbamate, and acyl.

Compounds

One embodiment described herein is a compound of formula (I):

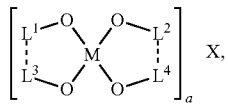
(I)

wherein:

(- - -) are optional bonds;

$L^1$, $L^2$, $L^3$, and $L^4$ are each $CR^1R^2R^3$;

each $R^1$, $R^2$, and $R^3$ are independently selected from H, F, a $C_1$-$C_{10}$ alkyl, a $C_1$-$C_{10}$ fluoroalkyl, and a phenyl that is optionally substituted with 1-5 substituents each independently selected from the group consisting of F, a $C_1$-$C_{10}$ alkyl, and a $C_1$-$C_{10}$ fluoroalkyl, with the proviso that each $R^3$ is absent when the optional bonds are present;

M is aluminum or boron;

a is 1 or 2; and

X is an alkali metal, an alkaline earth metal, or zinc.

X may be selected from the group consisting of magnesium, lithium, sodium, potassium, calcium, and zinc. In some embodiments, X is magnesium. In some embodiments, X is calcium.

Another embodiment described herein is a compound of formula (Ia):

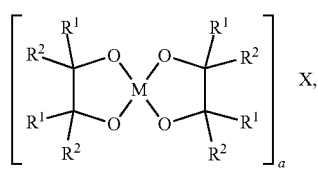
(Ia)

where each $R^1$ and $R^2$ may independently selected from H, F, a $C_1$-$C_{10}$ alkyl, a $C_1$-$C_{10}$ fluoroalkyl, and a phenyl that is optionally substituted with 1-5 substituents each independently selected from the group consisting of F, a $C_1$-$C_{10}$ alkyl, and a $C_1$-$C_{10}$ fluoroalkyl, with the proviso that each $R^3$ is absent when the optional bonds are present;

M is aluminum or boron;

a is 1 or 2; and

X is an alkali metal, an alkaline earth metal, or zinc.

Another embodiment described herein is a compound of formula (Ib):

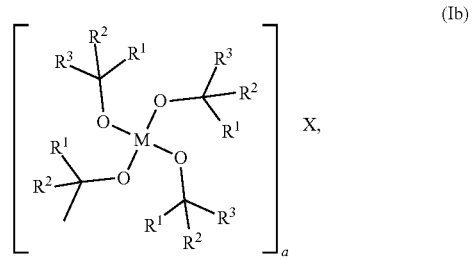
(Ib)

where each $R^1$, $R^2$, and $R^3$ are independently selected from H, F, a $C_1$-$C_{10}$ alkyl, a $C_1$-$C_{10}$ fluoroalkyl, and a phenyl that is optionally substituted with 1-5 substituents each independently selected from the group consisting of F, a $C_1$-$C_{10}$ alkyl, and a $C_1$-$C_{10}$ fluoroalkyl;

M is aluminum or boron;

a is 1 or 2; and

X is an alkali metal, an alkaline earth metal, or zinc.

In some embodiments, at least one of $R^1$, $R^2$, and $R^3$ is $CH_3$. In some embodiments, at least two of $R^1$, $R^2$, and $R^3$ are $CF_3$. In exemplary embodiments, one of $R^1$, $R^2$, and $R^3$ is $CH_3$ and two of $R^1$, $R^2$, and $R^3$ are $CF_3$.

Electrolytes

Another embodiment described herein is an electrolyte comprising a solvent; and a compound of formula (I), as defined above. For example, the electrolyte may comprise the compounds of formula (Ia) or (Ib) as described above.

The concentration of the compound of formula (I) will depend on the solvent and the other potential components of the electrolyte as described herein, including, for example, an ionic liquid and an alkali or alkaline earth metal salt. The concentration of the compound may be from about 0.01 M to about 1 M. The concentration of the compound may be from about 0.01 M to about 0.05 M, about 0.01 M to about 0.1 M, about 0.01 M to about 0.5 M, about 0.05 M to about 0.1 M, about 0.05 M to about 0.5 M, about 0.05 M to about 1 M, about 0.1 M to about 0.5 M, about 0.1 M to about 1 M, or about 0.5 M to about 1 M. In some embodiments, the concentration is about 0.5 M.

Solvents

The solvent may be any solvent suitable for use in battery electrolyte compositions. In some embodiments, the solvent is an organic solvent. The solvent may comprise an ether, an organic carbonate, a lactone, a ketone, a glyme, a nitrile, an aliphatic hydrocarbon solvent, an aromatic hydrocarbon solvent, an organic nitro solvent, an organosulfur compound, or combinations thereof. The type of solvent may be chosen by one of skill in the art based upon the particular compound of formula (I), as describe herein, and the type of battery or battery components, for example, the specific anode and cathode.

In some embodiments, the solvent comprises tetrahydrofuran, 2-methyl tetrahydrofuran, dimethoxyethane, glyme, monoglyme, diglyme, triglyme, tetraglyme, diethoxyethane, diethylether, proglyme, ethyl diglyme, butyl diglyme, dimethylsulfoxide, dimethylsulfite, sulfolane, ethyl methyl sulfone, acetonitrile, hexane, toluene, nitromethane, 1-3 dioxalane, 1-4 dioxane, trimethyl phosphate, tri-ethyl phosphate, hexa-methyl-phosphoramide (HMPA), dimethyl glycol, ethylene glycol dimethyl ether, diethyl ether, or combinations thereof. In certain embodiments, the solvent comprises at least one of dimethoxyethane, diglyme, ethyl diglyme, and butyl diglyme.

In addition, the solvent may include a small amount of impurities. For example, the solvent may include less than 5%, less than 1%, less than 0.5%, less than 0.1%, or less than 0.01% impurities by weight of the solvent. The solvent may have a volume of about 0.5 mL to about 20 mL, such as about 0.5 mL to about 15 mL, about 1 mL to about 10 mL or about 1 mL to about 5 m L.

Ionic Liquids

The electrolyte may further comprise an ionic liquid. Ionic liquids are salts which melt at a relatively low temperature, for example ≤100° C. Accordingly, an ionic liquid is essentially a salt in the liquid state. The presence of the ionic liquid may improve cycling stability of provided electrolyte compositions.

The ionic liquid may comprise a cation selected from the group consisting of imidazolium cations, pyrrolidinium cations, pyridinium cations, piperidinium cations, tetraalkylammonium cations, phosphonium cations, or combinations thereof.

The ionic liquid may comprise an anion selected from the group consisting of a halide anion, an acetate anion, tetrafluoroborate, hexafluorophosphate, tetrachloroaluminate, bis(trifluoromethanesulfonyl) imide, ethyl sulfate, dicyanamide, thiocyanate, fluorinated pinacolatoborate, fluorinated pinacolatoaluminate, anion part of the compound of formula (I), or combinations thereof.

Alkali Metal or Alkaline Earth Metal Salts

The electrolyte may further comprise $W_bZ_c$ wherein: W is an alkali metal or an alkaline earth metal; Z is a halide anion, an acetate anion, tetrafluoroborate, hexafluorophosphate, tetrachloroaluminate, bis(trifluoromethanesulfonyl) imide, ethyl sulfate, dicyanamide, thiocyanate, fluorinated pinacolatoborate, fluorinated pinacolatoaluminate, or combinations thereof; b is 1; and c is 1 or 2.

The disclosed electrolytes may have advantageous properties that make them useful for battery applications.

The electrolyte may have an anodic stability of greater than or equal to 2.0 Volts, greater than or equal to 2.5 Volts, greater than or equal to 3.0 Volts, greater than or equal to 3.5 Volts, greater than or equal to 4.0 Volts, greater than or equal to 4.5 Volts, greater than or equal to 5.0 Volts, greater than or equal to 5.5 Volts, or greater than or equal to 6.0 Volts versus an alkali metal or alkaline earth metal which is the same as the alkali metal or alkaline earth metal of X in the compound of formula (I). In some embodiments, the electrolyte has an anodic stability of greater than or equal to 4.0 Volts, greater than or equal to 4.5 Volts, or greater than or equal to 5.0 Volts, versus magnesium.

The electrolyte may have a Coulombic efficiency of greater than 70%, greater than 75%, greater than 80%, greater than 85%, greater than 90%, greater than 95%, greater than 96%, greater than 97%, greater than 98%, or greater than 99%. In some embodiments, the electrolyte has a Coulombic efficiency of about 90% to about 100%, of about 80% to about 100%, of about 70% to about 100%, of about 70% to about 90%, of about 70% to about 80%, or of about 80% to about 90%.

In some embodiments, the electrolyte may have an overpotential of less than 200 mV, less than 175 mV, less than 150 mV, less than 125 mV, or less than 100 mV. In certain embodiments, the electrolyte has an overpotential of about 150 mV to about 200 mV.

Batteries

The disclosed compounds and the corresponding electrolytes may be used in a battery. The battery may comprise an electrolyte as described herein, a cathode, and an anode, wherein the anode comprises a metal selected from an alkali metal, an alkaline earth metal or zinc, where the metal is the same as X in the compound of formula (I).

Accordingly, in some embodiments, the anode may comprise magnesium, lithium, sodium, potassium, calcium, and zinc. In exemplary embodiments, the anode may comprise magnesium and the battery can be referred to as a Mg ion battery.

The cathode may comprise sulfur, graphitic carbon, carbon fiber, glassy carbon, pyrolitic carbon, amorphous carbon, mesoporous carbon, carbon nanotubes, organic polymers, $Mo_6S_8$, $MnO_2$, CuS, $Cu_2S$, $Ag_2S$, $CrS_2$, $VOPO_4$, $TiS_2$, $V_2O_5$, $MgVO_3$, $MoS_2$, $MgV_2O_5$, $MoO_3$, $CuCr_2S_4$, $MgCr_2S4$, $MgMn_2O_4$, $Mg_2MnO_4$, $MgFe_2(PO_4)_3$, $MgV_2(PO_4)_3$, $MgMnSiO_4$, $MgFe_2(PO_4)_2$, $Mg_{0.5}VPO_4F$, $TiP_2O_7$, $VP_2O_7$, or $FeF_3$.

The battery according to the invention may be constructed by methods which are conventionally known in the art, including, for example, button or coin cell batteries, stacked cell batteries, prismatic, or pouch, cell or bi-cell batteries, and wound or cylindrical cell batteries.

The compounds, electrolytes, and batteries of the disclosure may be better understood by reference to the following examples, which are intended as an illustration of and not a limitation upon the scope of the disclosure.

EXAMPLES

Abbreviations used in the Schemes and Examples that follow include the following: CNT is carbon nanotubes; CV is cyclic voltammetry; DGM is diglyme or bis(2-methoxyethyl) ether; DME is dimethoxyethane; EDX is energy-dispersive X-ray spectroscopy; FPA is fluorinated pinacolatoaluminate; FPB is fluorinated pinacolatoborate ($B((CF_3)_4C_2O_2)_2$); h is hour; HFIP is hexafluoroisopropanol; MMAC is $Mg/MgCl_2/AlCl_3$, in reference to a ternary electrolyte; NMP is N-methyl-2-pyrrolidone; NMR is nuclear magnetic resonance; Pyr14 is 1-butyl-1-methylpyrrolidinium; and rt is room temperature.

$Mg(BH_4)_2$ (95%) and $KMnO_4$ (99%) were purchased from Sigma-Aldrich. 1,1,1,3,3,3-hexafluoro-2-propanol, hexafluoro-2,3-bis(trifluoromethyl)-2,3-butanediol, nonafluoro-tert-butyl alcohol, and 1,1,1,3,3,3-Hexafluoro-2-methyl-2-propanol were purchased from TCI Chemical. Mg powder (325 mesh) was purchased from Alfa-Aesar. Mg strip (99.5%) was purchased from GalliumSource. All the chemicals were used as received. DME was purified by distillation with Na before use. Diglyme (DGM) was stirred with Na scrap for 2 days before use. All the glassware used in the synthesis and electrochemical tests were washed with deionized water and dried at 150° C. for more than 12 h and then transferred into the glovebox immediately. $^1$H-, $^{19}$F-, and $^{11}$B-NMR spectrum were collected using a Bruker 500 MHz NMR spectrometer. Scanning electron microscopy (SEM) measurements were conducted on a FEI Quanta 650 (FEI, USA). X-ray diffraction (XRD) patterns were collected on a Rigaku Minifexll Desktop X-ray diffractometer. Battery testing was performed using a Lanhe battery testing system.

Example 1

Compound Synthesis
Synthesis of $Mg[B(HFIP)_4]_2$ Salt

The synthesis of $Mg[B(HFIP)_4]_2$ was carried out similarly to previously reported. Zhao-Karger, Z. et al., *J. Mater. Chem. A*, 5: 10815 (2017). Specifically, in an Argon filled glovebox, a solution of 2.82 g 1,1,1,3,3,3-hexafluoro-2- propanol (HFIP, 16.8 mmol, 8.4 eq.) in 5 mL of dry DME was added dropwise into the solution of 108 mg of $Mg(BH_4)_2$ (2.0 mmol, 1.0 eq.) in 20 mL of dry DME. Large amounts of $H_2$ gas were generated immediately. The reaction mixture was stirred under room temperature for 24 h, then the solution was concentrated to about 4 mL under vacuum. 30 mL of dry hexane was added to precipitate out the $Mg[B(HFIP)_4]_2$ salt. Filtration, washing with 2×10 mL dry hexane, and vacuum-drying obtained the final product as white microcrystalline powder. 2.17 g, 77% yield.

$^1H$ NMR (MeCN-$d_3$, 500 MHz, ppm): δ 4.76 (m, 8H), 3.52 (s, 12H, CH2 of DME), 3.34 (s, 18H, CH3 of DME). $^{19}F$-NMR (MeCN-$d_3$, 470 MHz, ppm): δ −75.38 (s, 48F). $^{11}B$-NMR (MeCN-$d_3$, 160 MHz, ppm): δ 3.53 (s, 2B). Elemental analysis for $Mg[B(HFIP)_4]_2 \cdot 4DME$, $C_{40}H_{48}B_2F_{48}MgO_{14}$, Calculated: C, 27.57, H, 2.78. Found: C, 27.45, H, 2.76.

Synthesis of Mg-FPB Salt

In an Argon filled glovebox, a solution of 2.81 g hexafluoro-2,3-bis(trifluoromethyl)-2,3-butanediol (8.4 mmol, 4.2 eq.) in 5 mL of dry DME was added dropwise into the solution of 108 mg of $Mg(BH_4)_2$ (2.0 mmol, 1.0 eq.) in 20 mL of dry DME. Large amounts of $H_2$ gas were immediately generated. The reaction mixture was stirred under room temperature for 2 h and then heated to 60° C. for another 24 h. The solution was concentrated to about 5 mL under vacuum, and 30 mL of dry hexane was added to precipitate the Mg salt. Filtration, washing with 2×10 mL dry hexane, and vacuum-drying obtained the final product Mg-FPB as white microcrystalline powder. 2.41 g, 87% yield.

$^{19}F$-NMR (MeCN-$d_3$, 470 MHz, ppm): δ −70.36 (s, 48F). $^{11}B$-NMR (MeCN-$d_3$, 160 MHz, ppm): δ 13.36 (s, 2B). Elemental analysis for Mg-FPB·3DME, $C_{36}H_{30}B_2F_{48}MgO_{14}$, Calculated: C, 26.29, H, 1.84. Found: C, 26.35, H, 1.86.

Synthesis of Li-FPB, Na-FPB, K-FPB, and Ca-FPB Salts

The Li-FPB, Na-FPB, K-FPB, and Ca-FPB salts were prepared using an analogous method as for Mg-FPB with $LiBH_4$, $NaBH_4$, $KBH_4$, and $Ca(BH_4)_2$.

Another Method for the Synthesis of Li-FPB, Na-FPB, K-FPB, Mg-FPB, and Ca-FPB Salts 7.05 g (21.1 mmol, 2 eq.) hexafluoro-2,3-bis(trifluoromethyl)-2,3-butanediol, 10.6 mmol LiOH, NaOH, or KOH, or 5.3 mmol $Mg(OH)_2$, or $Ca(OH)_2$, 0.66 g (10.55 mol) boric acid, and distilled water were refluxed in a flask overnight. The water was evaporated on a rotary evaporator under reduced pressure, and the residual solid was dried in a vacuum oven at 100° C. for 48 h. The crude product was sublimed under reduced pressure to give white crystals.

Synthesis of FPA Salts

In the case of more active $AlH_4^-$, the reaction was completed at room temperature (the synthesis of Na-FPA). Taking Na-FPA as example, in an Argon filled glovebox, a solution of 2.81 g hexafluoro-2,3-bis(trifluoromethyl)-2,3-butanediol (8.4 mmol, 4.2 eq.) in 5 mL of dry DME was added dropwise into the solution of 108 mg of $NaAlH_4$ (2.0 mmol, 1.0 eq.) in 20 mL of dry DME. Large amounts of $H_2$ gas were immediately generated. The reaction mixture was stirred under room temperature for 2 h. The solution was concentrated to about 5 mL under vacuum, and 30 mL of dry hexane was added to precipitate the Mg salt. Filtration, washing with 2×10 mL dry hexane, and vacuum-drying obtained the final product Na-FPA as white microcrystalline powder. Mg-FPA was prepared through cation exchange from Na-FPA.

Example 2

Electrolyte Preparation and Crystal Structure Determination

In general, the Mg electrolytes were prepared by dissolving the Mg salts in dry diglyme and then treating with Mg powder (50 mg/mL) at 50° C. for 24 h. The Mg powder and any insoluble species were removed by filtration to obtain the Mg electrolytes as clean solutions. No further purification was needed. For Mg-FPB-DGM electrolyte (0.5 M), 1.37 g Mg-FPB (1.0 mmol) was dissolved in 2.0 mL of dry diglyme with 100 mg of Mg powder. The mixture was stirred at 50° C. for 24 h.

Crystals of Mg-FPB suitable for X-ray diffraction studies were grown using concentrated diglyme solutions of Mg-FPB with slow diffusion of diethyl ether at ambient temperature. Data was collected at 100 K on a Bruker D8 Venture using Mo Kα-radiation (λ=0.71073 Å) and corrected for absorption using SADABS area detector absorption correction program. Using Olex2, the structure was solved with the SHELXT structure solution program using Direct Methods and refined with the SHELXL refinement package using least squares minimization. All non-hydrogen atoms were refined with anisotropic thermal parameters. Hydrogen atoms attached to heteroatoms were found from the residual density maps, placed, and refined with isotropic thermal parameters. All other hydrogen atoms in the investigated structure were located from difference Fourier maps but were placed in geometrically calculated positions and refined using a riding model. Isotropic thermal parameters of the placed hydrogen atoms were fixed to 1.2 times the U value of the atoms they are linked to (1.5 times for methyl groups). Calculations and refinement of structures were carried out using APEX2, SHELXTL, and Olex2 software.

Example 3

Electrochemical Measurements

The preparation and electrochemical tests of the electrolytes were conducted in a glovebox ($C_{Oxygen}$<1 ppm, $C_{Water}$<1 ppm). Conductivity of the electrolytes were measured using a Mettler Toledo conductivity meter at room temperature. All electrochemical experiments were conducted with a Gamry 1000e potentiostat. The working electrode and reference electrode were polished before electrochemical tests.

Preparation of the $MnO_2$ Cathode Material $MnO_2$ (α phase) was prepared according similarly to as previously report with modification. 474.1 mg $KMnO_4$ and 480 mg concentrated HCl (38%) were added into 30 mL deionized water. The mixture was stirred and sonicated in an ultrasonic bath for several minutes until the solid was totally dissolved. Then, the solution was transferred to Teflon-line stainless steel thermal autoclave and incubated at 140° C. for 12 hours. After cooling down to room temperature, the product was filtered and rinsed with deionized water. Following drying at 60° C. under vacuum for 12 hours, the final product $MnO_2$ was obtained.

Electrochemical Tests

Electrochemical measurements were performed by a Gamry 1000e potentiostat with a three-electrode cell system, in which a glassy carbon electrode (GC, 1.0 mm diameter), aluminum rod (Al, 47 mm² working surface area), stainless steel sheet (SS, 24 mm² working surface area), Ti sheet (32 mm² working surface area), or Mg strip (28 mm² working area) were used as the working electrode, a Mg strip as counter electrode, and reference electrode. 1.0 mL of electrolyte was used for each electrochemical measurement. The cyclic voltammetry (CV) and linear sweep voltammetry (LSV) tests were carried out at a scan rate of 50 mV/s.

Symmetric Mg|Mg-FPB-DGM|Mg Cell Test

The symmetric Mg|Mg-FPB-DGM|Mg tests were performed on 2032 type coin cell and assembled in an Ar-filled glovebox ($H_2O<1$ ppm, $O_2<1$ ppm). The coin cell was assembled using Mg metal foil on both working and counter electrode, 0.5 M Mg-FPB-DGM electrolyte. Galvanostatic charge-discharge tests were conducted on Lanhe tester (Wuhan, China).

Mg Ion Battery Tests $MnO_2$, carbon black ($C_{45}$) and polyvinylidene difluoride (PVDF) were uniformly mixed to prepare an electrode at ratio of 7:2:1 and dispersed in N-methyl-2-pyrrolidone (NMP) solvent. After stirring for 6 hours, the slurry was coated on aluminum foil, the dried at 80° C. under vacuum for 12 hours. The coated carbon paper was pouched to φ1 cm disc and used as cathode Mg ion battery.

The Mg ion battery tests were performed on 2032 type coin cell and assembled in an Ar-filled glovebox ($H_2O<1$ ppm, $O_2<1$ ppm). The coin cell was assembled using glass fiber separator and polished Mg metal foil as counter electrode, 0.5 M Mg-FPB-DGM electrolyte. Galvanostatic charge-discharge tests were conducted on Lanhe tester (Wuhan, China).

Example 4

Magnesium Electrolytes

A key consideration in the development of Cl-free Mg salt electrolytes, is the choice of the weakly coordinating anions due to the necessity of electrochemical and chemically stability for a wide voltage window and electrochemical/chemical compatibility with electrode materials. Mg salts with weaker anion-cation interaction can give higher solubility and ionic conductivity in electrolyte solutions. In light of strong Al—O (510 kJ/mol) and B—O bonds (809 kJ/mol) and the chelating effect of polydentate ligands, chemically stable Al/B anions supported with bidentate alkyloxide ligands were used in developing Cl-free Mg salt electrolytes. A summary of the synthesis of fluorinated magnesium alkoxyborates and alkoxyauminates is shown in Scheme 1.

First, $Mg(BH_4)_2$ was reacted with pinacol (hexafluoro-2,3-dimethyl-2,3-butanediol). However, the reaction did not go completion to form magnesium bispinacolato borate, $Mg[B((CH_3)_4C_2O_2)_2]_2$. Because of a high $pK_a$ (ca. 18) of the alcohol protons of pinacol, NMR studies indicated that pinacol only undergoes part deprotonation by $BH_4^-$ even in refluxed DME (FIG. 1). In addition, the resulting solution was not electrochemically active for Mg deposition.

Figure 2A:
FIG. 2A, FIG. 2B, FIG. 2C, and FIG. 2D show the NMR spectra and X-ray crystal structure of the synthesis of MG-FPB (magnesium fluorinated pinacolatoborate). $^{19}$F (FIG. 2B) and $^{11}$B-NMR (FIG. 2C) spectrums of Mg-FPB in MeCN-$d_3$. X-ray single crystal structure of Mg-FPB (FIG. 2D) Mg, green; O, red; C, gray; H, white; B, orange; F, green yellow.
Figure 2B:
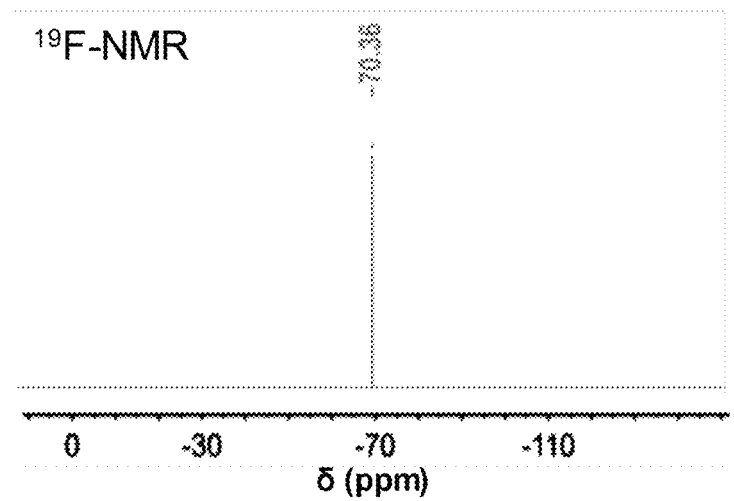
Figure 2C:
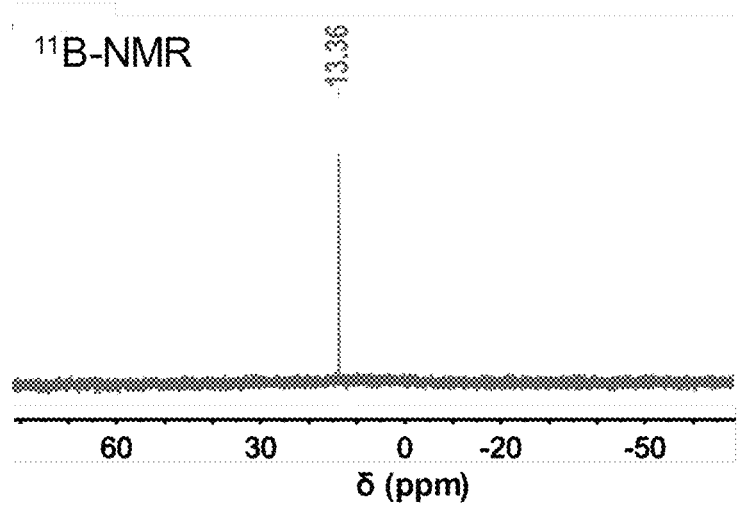
Figure 2D:
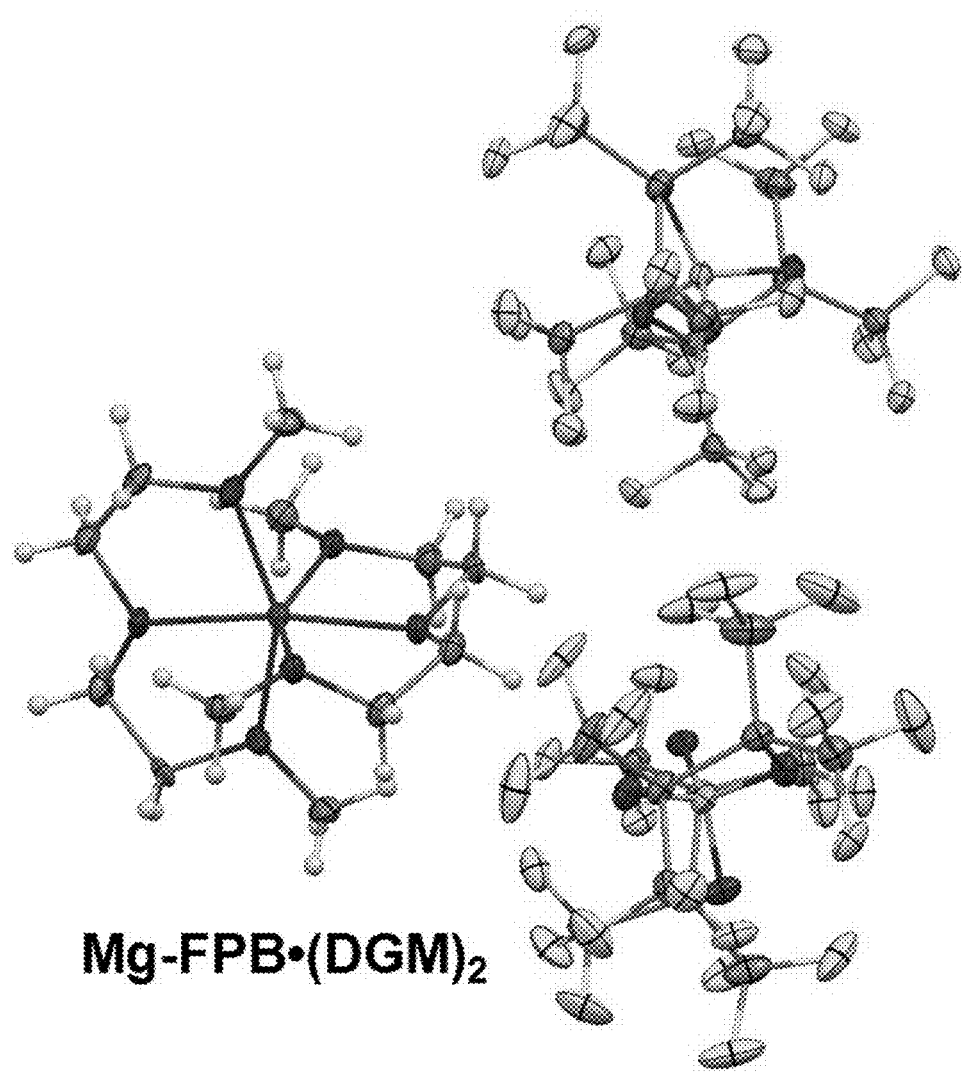

A perfluorinated pinacol, (hexafluoro-2,3-ditrifluoromethyl-2,3-butanediol), was the used as a bidentate alkyloxide ligand precursor. Due to the strong electron-withdrawing effect of —$CF_3$ groups, the perfluorinated pinacol was expected to have more acidic protons to allow complete deprotonation with $BH_4^-$. The reaction of a 1:4 ratio of $Mg(BH_4)_2$ and the perfluorinated pinacol readily proceeded to completion at 60° C. in DME to yield magnesium fluorinated pinacolatoborate, $Mg[B((CF_3)_4C_2O_2)_2]_2$ (Mg-FPB) in a good isolated yield of 87%. The Mg-FPB salt was fully characterized by $^{11}B$-NMR, $^{19}F$-NMR, and elemental analysis. Mg-FPB displayed a single resonance in the $^{19}F$-NMR (70.36 ppm) and $^{11}B$-NMR (111.36 ppm) spectra (FIG. 2B-2C), which was consistent with the expected tetrahedral geometry of the FPB anion. The Mg-FPB salt had a good solubility of 0.5 M in diglyme (DGM). The molecular structure of Mg-FPB solvated by DGM was unambiguously determined by single crystal X-ray diffraction (FIG. 2D). In the X-ray diffraction determined structure, the Mg ion is coordinated by two tridentate DGM in an octahedral geometry and paired with two tetrahedral FPB anions for charge neutrality.

In the case of more active $AlH_4^-$, the reaction was performed at room temperature via Na-FPA. Na-FPA was first prepare and then a cation exchange step was used to obtain Mg-FPA. Like, Mg-FPB and $Mg[B(HFIP)_4]_2$, the resulting product was a white microcrystalline powder.

Figure 5:
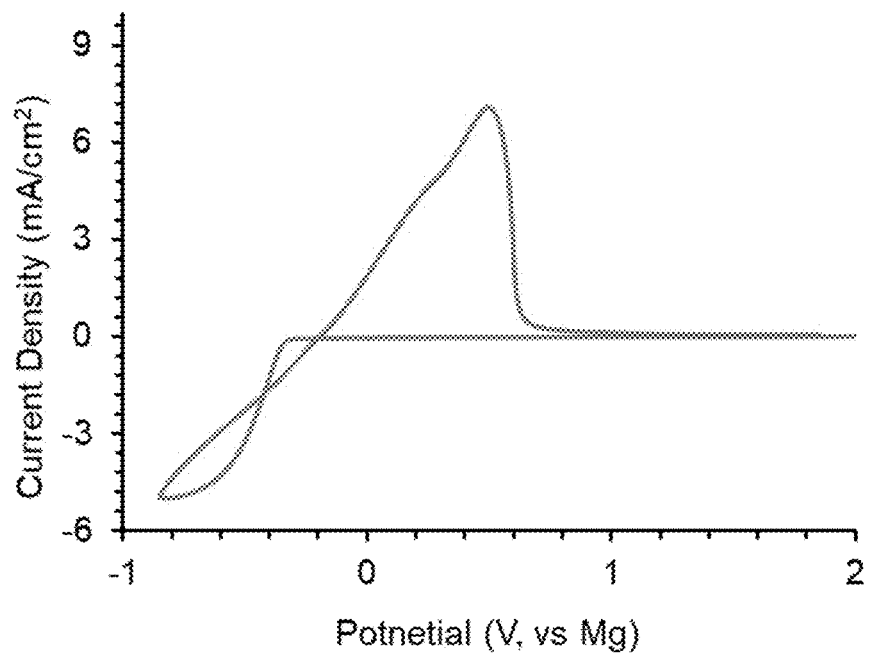
FIG. 5 is a CV curve of the electrolyte with 0.1 M Mg-FPA (magnesium fluorinated pinacolatoaluminate) in diglyme. GC as working electrode, Mg as reference and counter electrode, 50 mV/s scan rate.
Figure 6A:
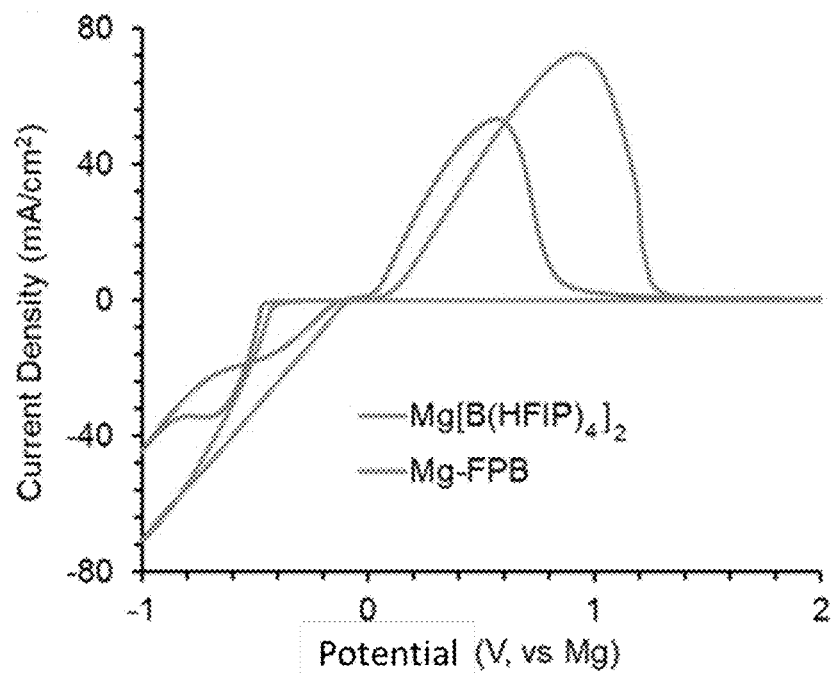
FIG. 6A, FIG. 6B, and FIG. 6C are graphs showing the cyclic voltammetry (CV) curves of 0.5 M $Mg[B(HFIP)_4]_2$-DGM (blue) and Mg-FPB-DGM (orange) electrolytes (FIG. 6A), LSV curves of the $Mg[B(HFIP)_4]_2$-DGM (blue) and Mg-FPB-DGM (orange) electrolytes (FIG. 6B), and plots of charge over time of the Mg plating and stripping of the $Mg[B(HFIP)_4]_2$-DGM (blue) and Mg-FPB-DGM (orange) electrolytes (FIG. 6C). GC as working electrode, Mg as reference and counter electrode, 50 mV/s scan rate.
Figure 6B:
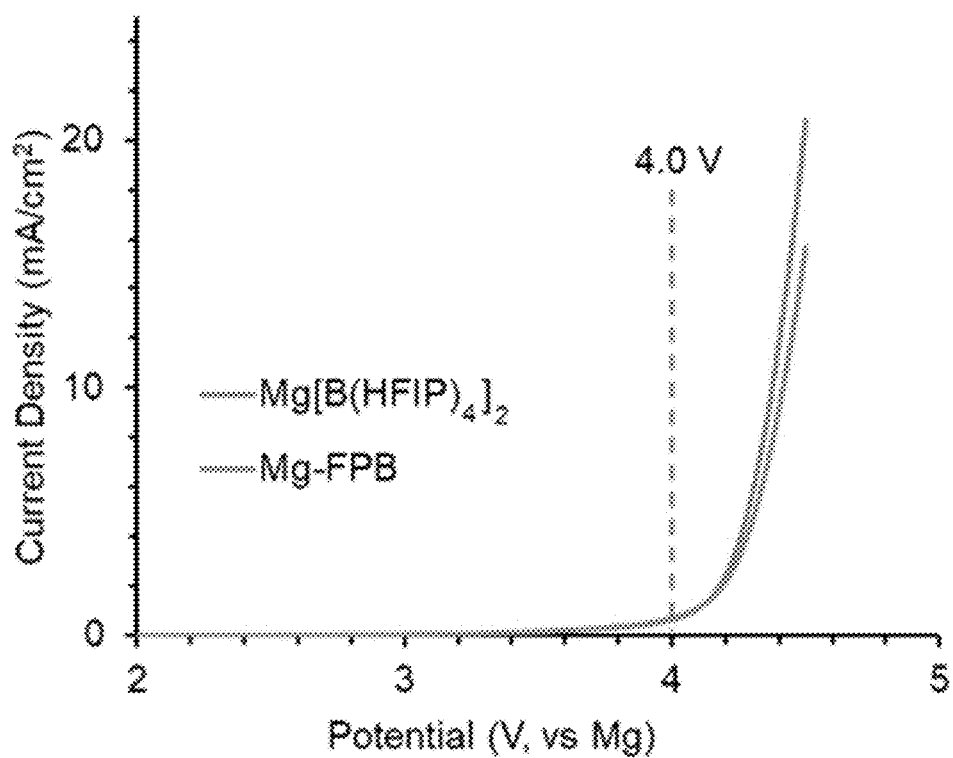
Figure 6C:
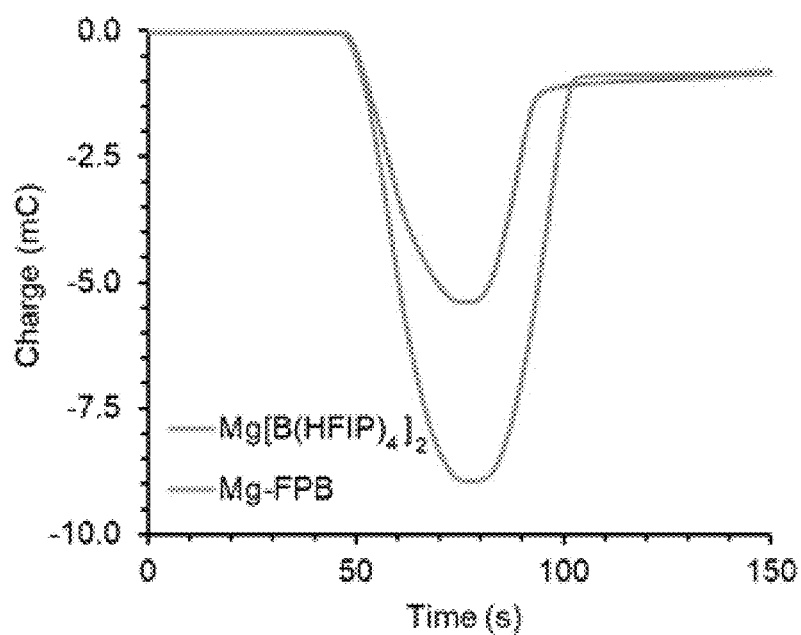
Figure 7A:
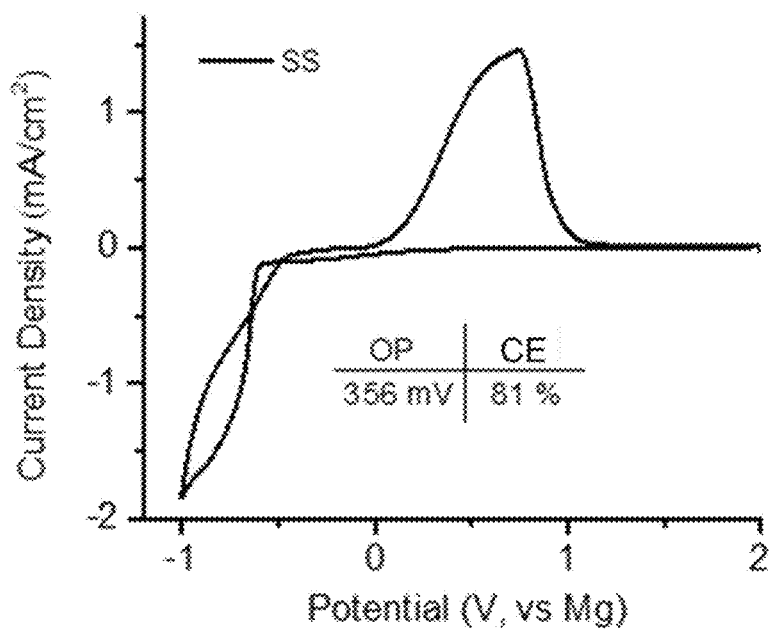
FIG. 7A, FIG. 7B, FIG. 7C, FIG. 7D, FIG. 7E, and FIG. 7F are CV curves of 0.5 M Mg-FPB-DGM electrolyte with different working electrodes.
Figure 7B:
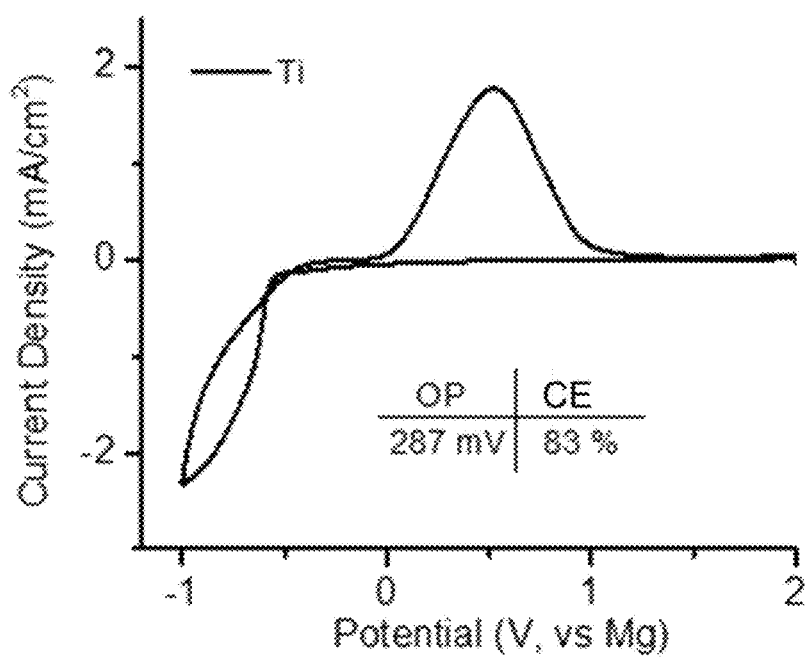
Figure 7C:
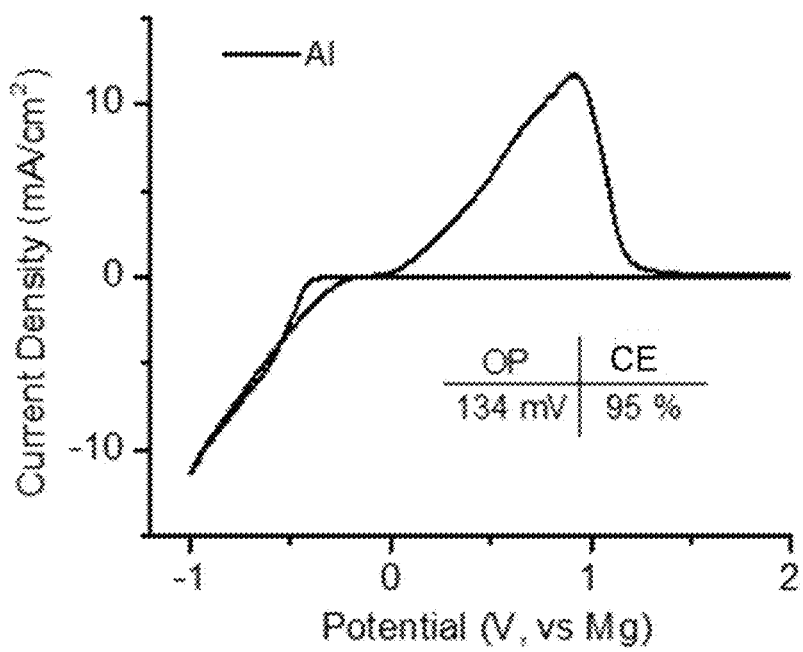
Figure 7D:
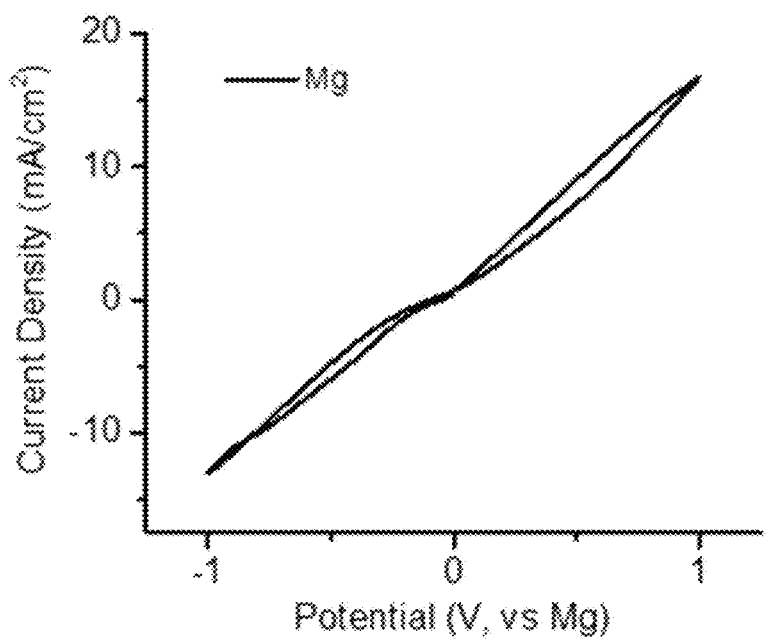
Figure 7E:
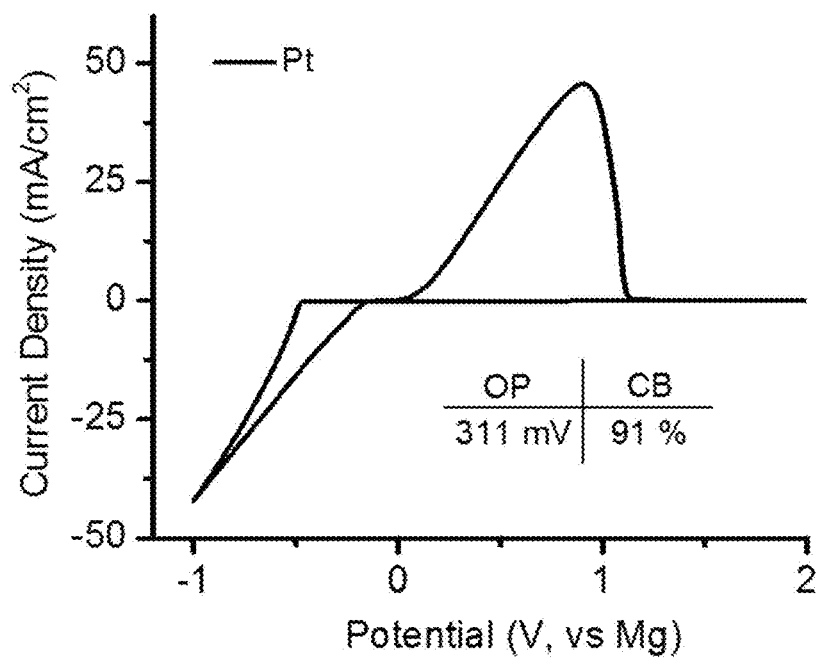
Figure 7F:
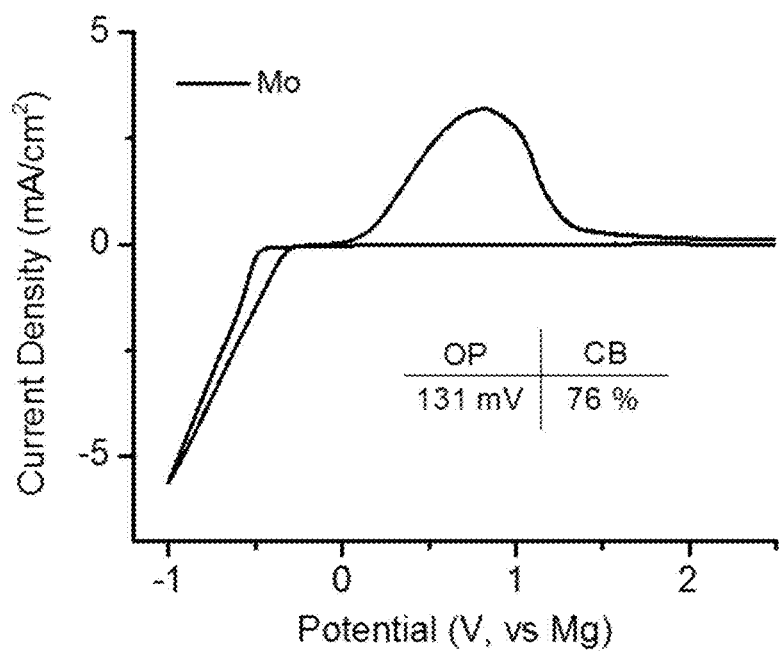

A 0.5 M Mg-FPB electrolyte in DGM (3.95 mS/cm conductivity) was subsequently studied for its electrochemical activity for Mg deposition/stripping. As shown in the cyclic voltammogram (FIG. 3A), the Mg-FPB electrolyte displayed a reversible Mg deposition/stripping wave with an onset potential at −0.308 V vs Mg and a stripping potential at −0.111 V, giving overpotential of 197 mV which is comparable with MMAC electrolytes but smaller than reported Cl-free Mg electrolytes. A high coulombic efficiency of 95% was obtained at 50 mV/s with glassy carbon electrode (FIG. 5 and FIG. 6). Furthermore, the Mg-FPB electrolyte exhibited an outstanding anodic stability at >4.0 V vs Mg, which was comparable with reported Cl-free Mg electrolytes, but significantly improved over other reported Mg electrolytes.

Figure 3:
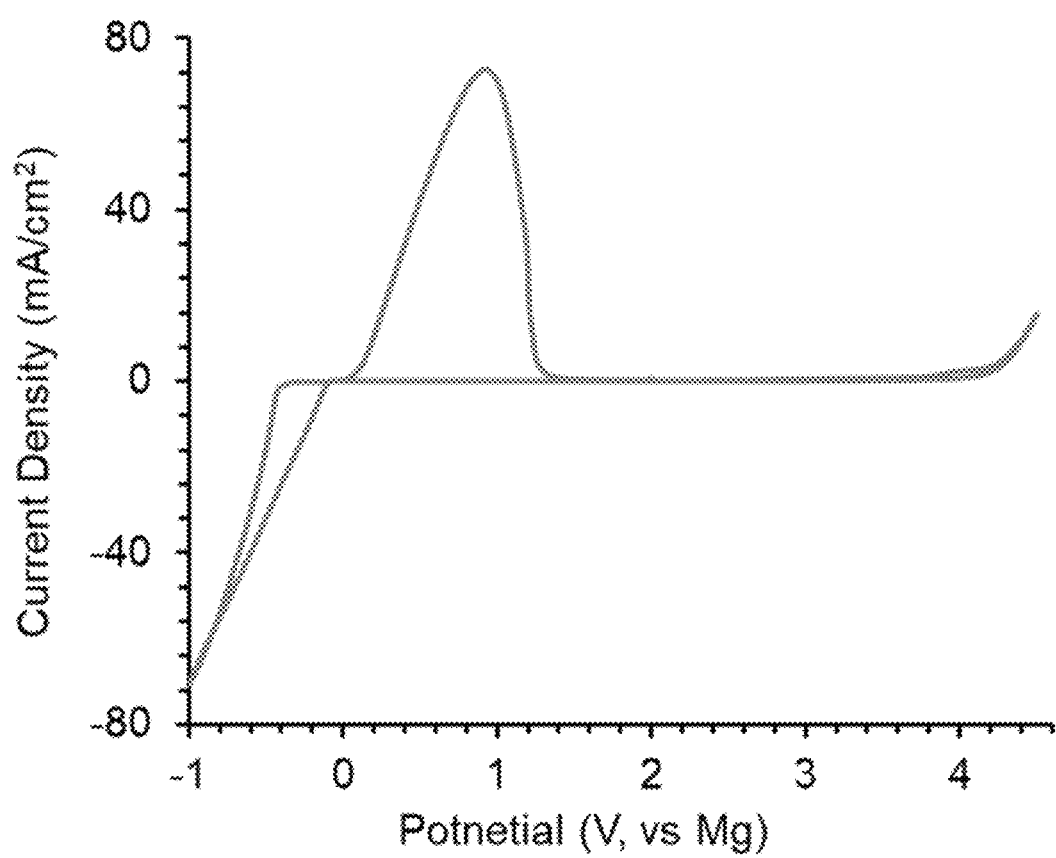
FIG. 3 is a CV curve of 0.5 M Mg-FPB-DGM (diglyme) electrolyte on glassy carbon (GC) working electrode.
Figure 4:
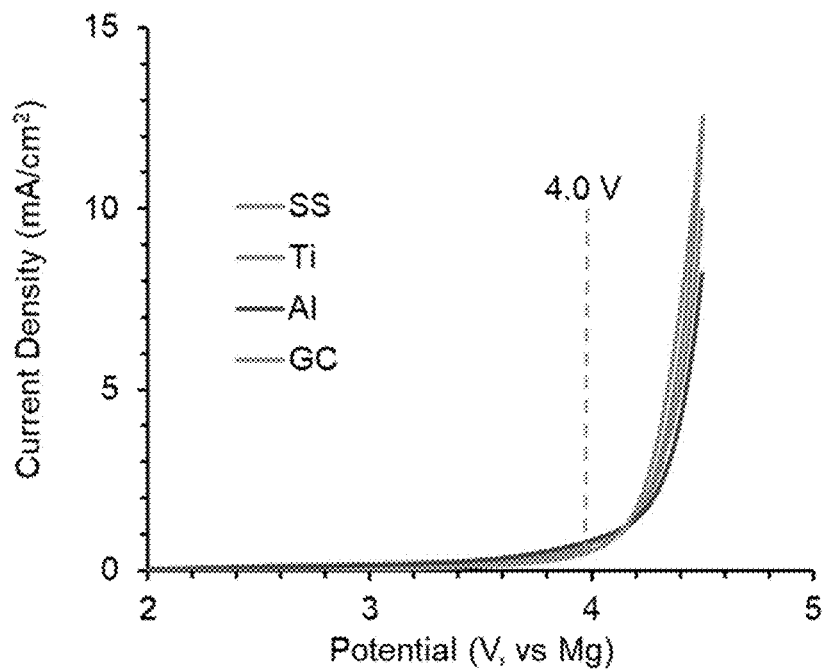
FIG. 4 shows linear sweep voltammetry (LSV) curves of different working electrodes showing the anodic stability of the Mg-FPB-DGM electrolyte: stainless steel (SS, blue), Ti (green), Al (purple), glassy carbon (GC, orange). Mg as reference and counter electrode, 50 mV/s scan rate.

Chloride containing Mg electrolytes are corrosive with common metallic current collectors, such as stainless steel (SS) and aluminum (Al), which makes them impractical for widespread use. In a stark contrast, the Mg-FPB electrolyte displayed high anodic stability of ca. 4.0 V vs. Mg with a variety of working electrodes including stainless steel (SS), Ti, and Al (FIG. 3B and FIG. 4). All of them demonstrated reversible Mg deposition with coulombic efficiencies of 81% for SS, 83% Ti, and 95% for Al, respectively (FIG. 7). In addition, when Mg metal was used as a working electrode, as shown in FIG. 8D, the Mg plating/stripping on the surface of Mg metal was extremely smooth, and no overpotential was observed.

Figure 9A:
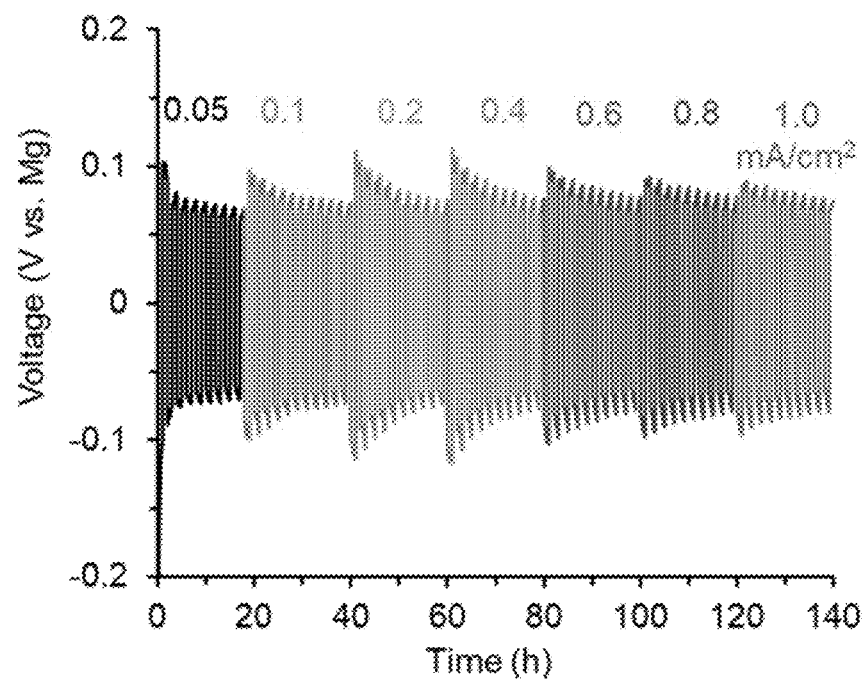
FIG. 9A and FIG. 9B are graphs showing Mg metal plating/stripping (FIG. 9A) from an Mg|0.5 M Mg-FPB- DGM|Mg symmetric cell tested at current density from 50 μA/cm² to 1.0 mA/cm² and galvanostatic cycling performance (FIG. 9B) of Mg|0.5 M Mg-FPB-DGM|Mg symmetric cell at 0.1 mA/cm².
Figure 9B:
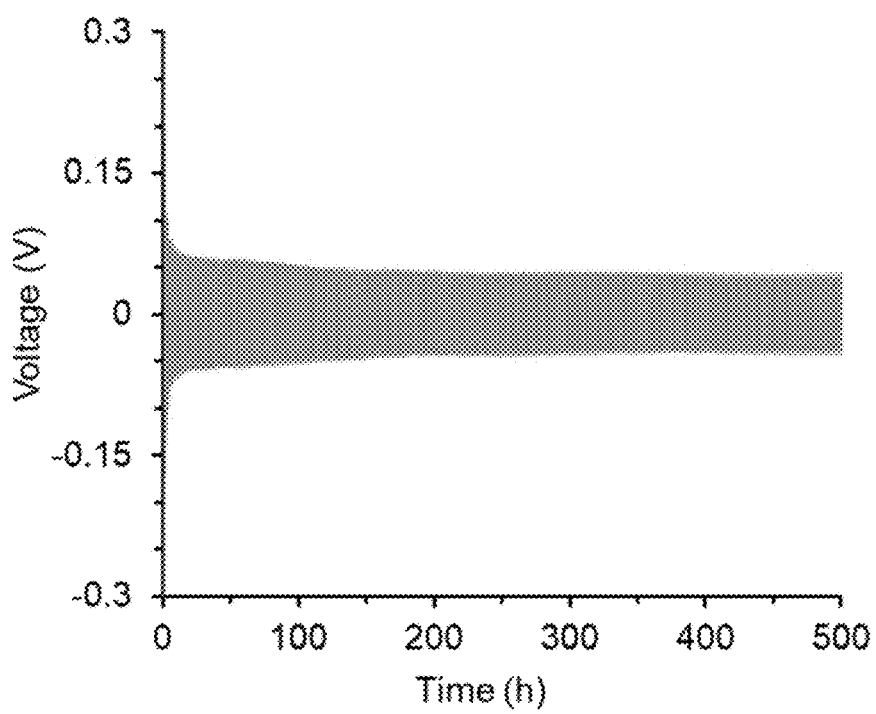

Subsequently, a symmetric Mg|0.5 M Mg-FPB-DGM|Mg cell was assembled to evaluate the long-term electrochemical performance of the Mg-FPB electrolyte as shown in FIGS. 9A and 9B. The symmetric cell was tested from 50

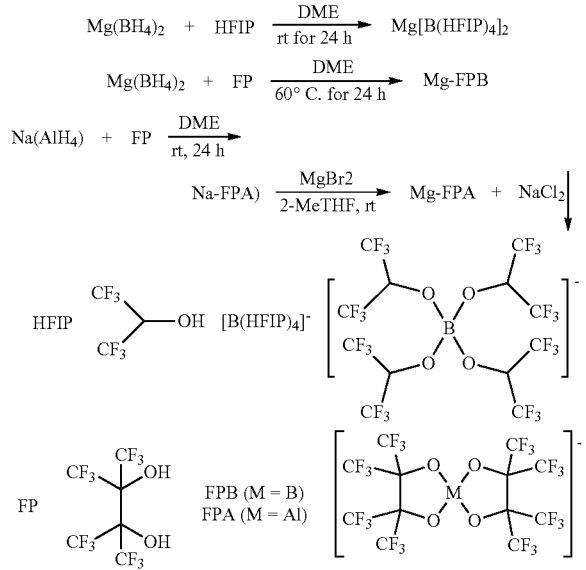

μA/cm² to 1.0 mA/cm² current density. At 50 μA/cm² current density, the polarization was lowered to 70 mV (vs. Mg), and even when the current density was increased to 1.0 mA/cm2, the polarization was still below 100 mV (ca. 90 mV vs. Mg). The high performance of Mg-FPB electrolyte was attributed to the designed non-coordinating FPB anion that likely had weak interactions with $Mg^{2+}$ cations enabling a fast electrochemical deposition and striping process. The polarization performance was much better than the traditional MMAC and other Lewis acid-base magnesium electrolyte. The symmetric cell was cycled at 0.1 mA/cm² as shown in FIG. 9B, and even after cycling for 500 hours the polarization did not show obvious change beyond the first several hours. The stable polarization during galvanostatic cycling demonstrated that the MgFPB-DGM electrolyte had an excellent cathodic stability for long lifespan Mg batteries.

Figure 10A:
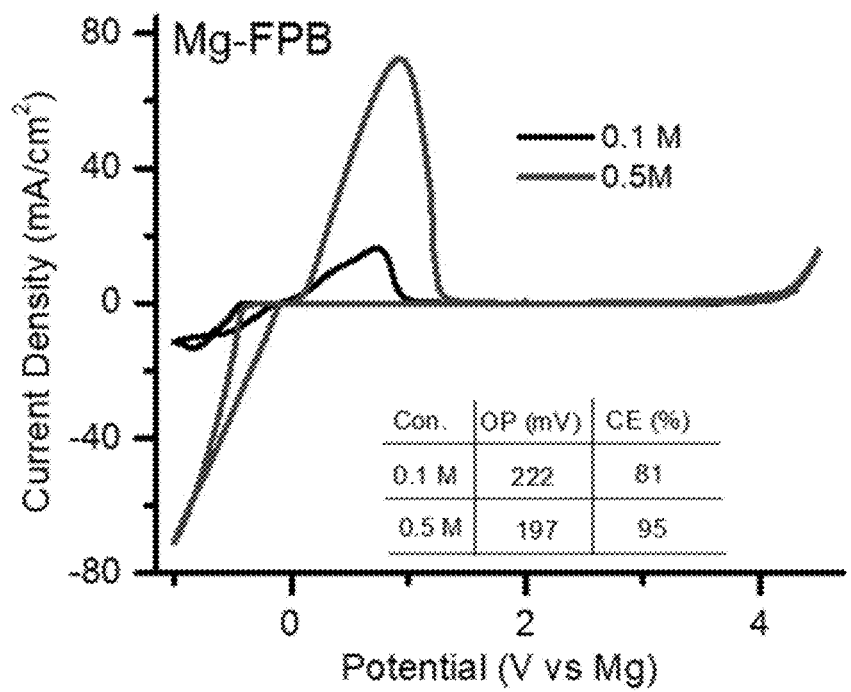
FIG. 10A and FIG. 10B are CV curves of Mg-FPB (FIG. 10A) and Mg[B(HFIP)$_4$]$_2$ (FIG. 10B) in DGM with 0.1 M and 0.5 M concentration. OP: overpotential, CE: Coulombic efficiency. GC as working electrode, Mg as reference and counter electrode, 50 mV/s scan rate.
Figure 10B:
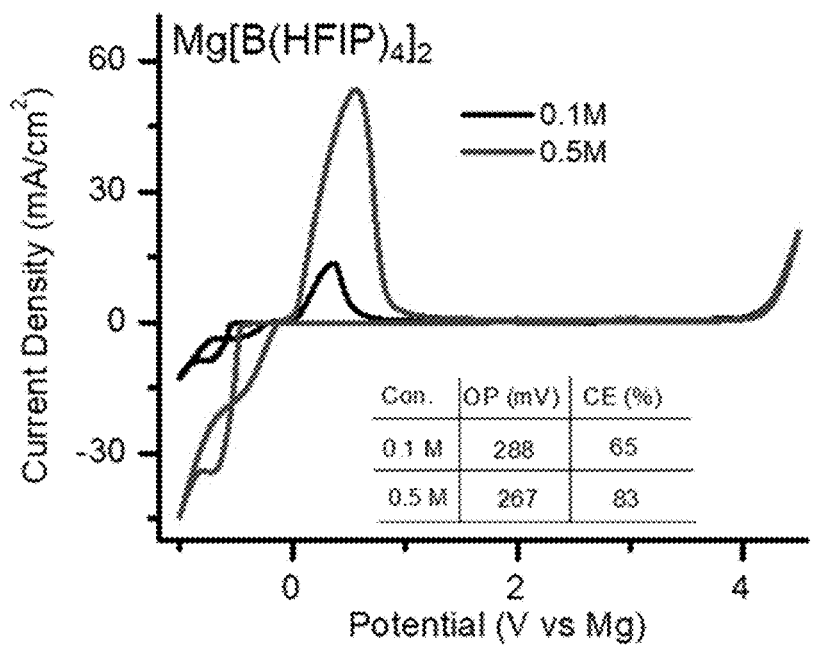

To investigate the beneficial effects of the chelating FPB ligand in the Mg-FPB over the monodentate ligand used in the reported $Mg[B(HFIP)_4]_2$ electrolyte, cyclic voltammetry (CV) studies of $Mg[B(HFIP)_4]_2$ were also conducted under the same conditions (FIG. 6). $Mg[B(HFIP)_4]_2$ displayed a larger overpotential (267 mV) and lower coulombic efficiency (83%) for Mg deposition/stripping than Mg-FPB although comparable cathodic stability (Table 1). The Mg deposition/stripping reversibility of Mg-FPB electrolyte was much better than that of the $Mg[B(HFIP)_4]_2$ electrolyte under different concentrations and measured ranges (FIGS. 8 and 10).

TABLE 1

Electrochemical Performance Data of the 0.5 M Mg-FPB and other Electrolytes in DGM.

| Electrolyte | $E_{onset}$ (V, vs Mg) | η (mV) | CE (%) | $E_{anodic}$ (V, vs Mg) |
|---|---|---|---|---|
| Mg-FPB | −0.308 | 197 | 95 | 4.0 |
| $Mg[B(HFIP)_4]_2$ | −0.387 | 267 | 83 | 4.0 |
| MMAC | −0.332 | 212 | 85 | 3.8 |

As shown in FIG. 10, under both low concentration (0.1 M) and high concentration (0.5 M), the $Mg[B(HFIP)_4]_2$-DGM electrolyte delivered higher overpotential and lower coulombic efficiency than that of Mg-FPB-DGM electrolyte, which indicated better reversibility of Mg deposition/stripping in Mg-FPB electrolyte than in $Mg[B(HFIP)_4]_2$ electrolyte. Moreover, in the negative scan process, there was a current peak of the Mg deposition for the $Mg[B(HFIP)_4]_2$ electrolyte (at −0.74 V), which was due to the diffusion or charge transfer limitation of the $Mg^{2+}$ reduction reaction. However, it was not observed for the Mg-FPB electrolyte. These results indicated better kinetics of $Mg^{2+}$ reduction in the Mg-FPB electrolyte. Additionally, the Mg stripping peak current of Mg-FPB electrolyte was much higher than that of $Mg[B(HFIP)_4]_2$ electrolyte at both concentrations, which indicated higher electrochemical activity of Mg-FPB electrolyte.

Figure 8A:
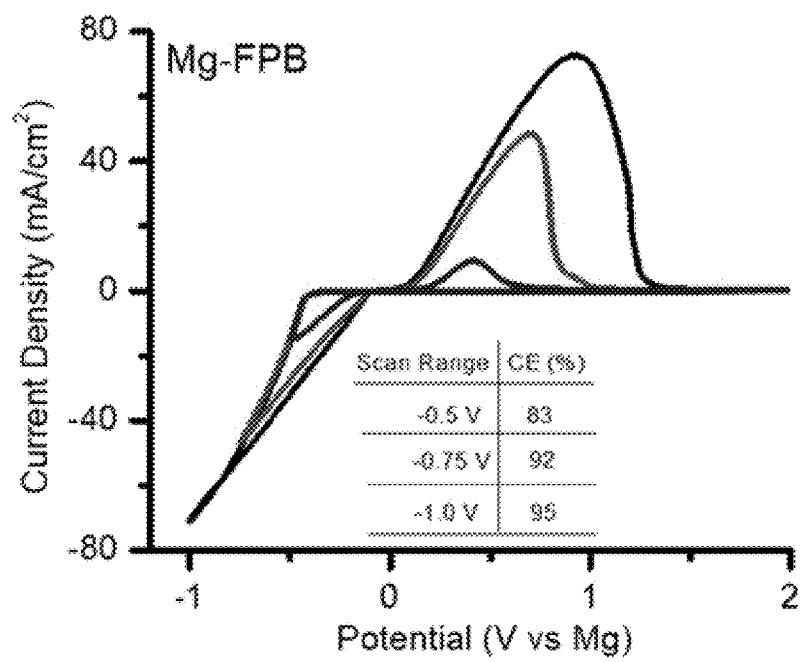
FIG. 8A and FIG. 8B are CV curves and the corresponding Coulombic efficiencies of 0.5 M Mg-FPB (FIG. 8A) and $Mg[B(HFIP)_4]_2$ (FIG. 8B) in DGM with different scan range. GC as working electrode, Mg as reference and counter electrode, 50 mV/s scan rate.
Figure 8B:
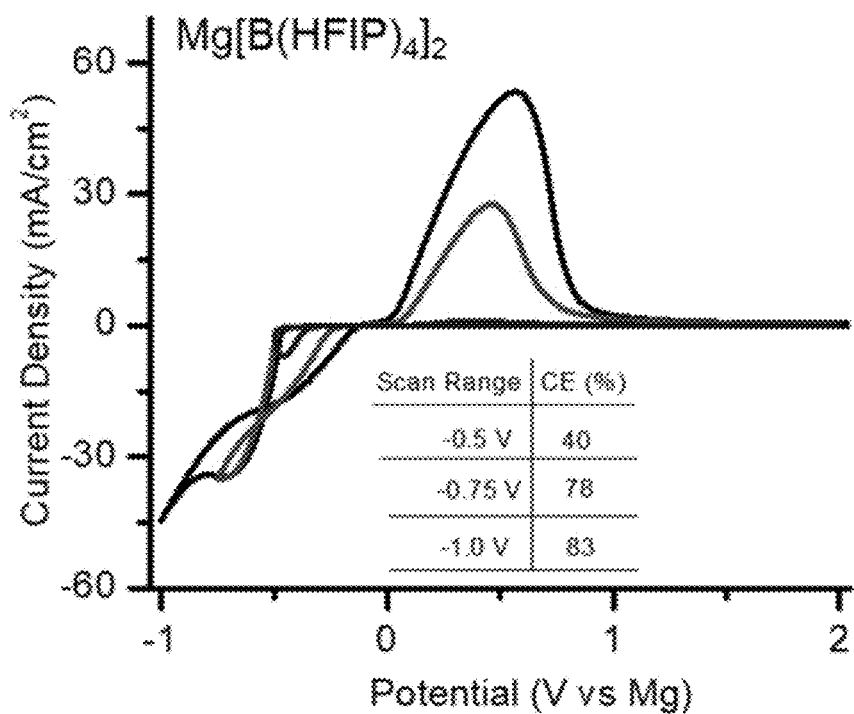

For an in-depth understanding of the coulombic efficiency loss during the Mg plating/stripping, CV curves were recorded with different return potentials for both Mg-FPB and $Mg[B(HFIP)_4]_2$ electrolytes. As shown in FIG. 8, when the CV scan returned at less negative potential, the obtained coulombic efficiencies were dramatically reduced from 83% (returned at −1.0 V) to 40% (returned at −0.5 V) for the $Mg[B(HFIP)_4]_2$-DGM electrolyte (FIG. 8B). However, in the case of Mg-FPB-DGM electrolyte (FIG. 8A), the reduced of coulombic efficiency was not significant with the return potential shift from −1.0 V to −0.5 V (from 95% to 83%). These results indicated higher reversibility of Mg plating plating/stripping in the Mg-FPB-DGM electrolyte than in the $Mg[B(HFIP)_4]_2$ electrolyte over a broad potential range. The general trend of reduced coulombic efficiency with less negative return potential also indicated that the side reactions that induced irreversible Mg deposition/stripping mainly occurred at low overpotential range.

Figure 11:
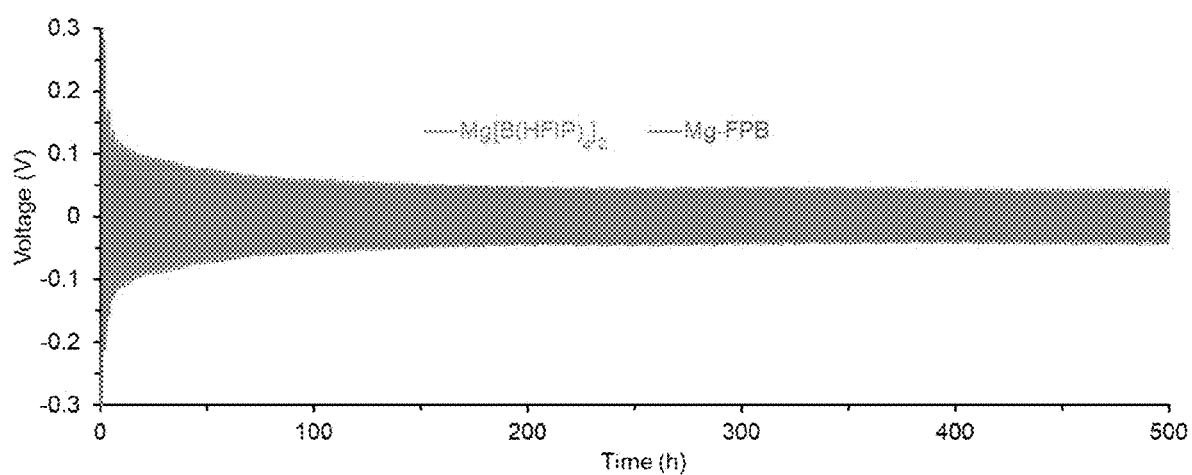
FIG. 11 is a graph showing the galvanostatic cycling performance of Mg|0.5 M Mg-FPB-DGM|Mg (blue) and Mg|0.5 M Mg[B(HFIP)$_4$]$_2$-DGM|Mg (orange) symmetric cell at 0.1 mA/cm².
Figure 12A:
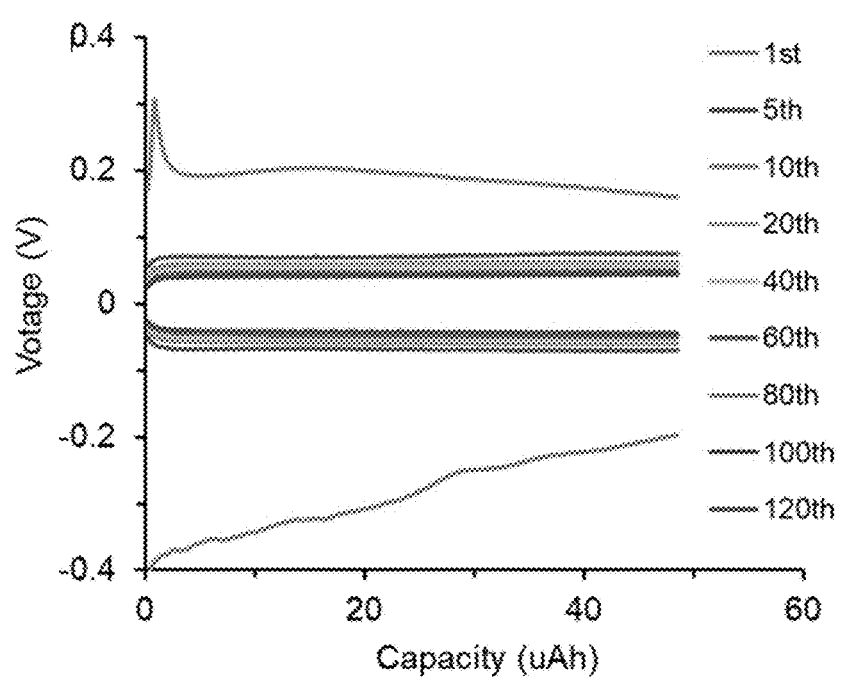
FIG. 12A and FIG. 12B are graphs showing the voltage profile for the Mg|0.5 M Mg-FPB-DGM|Mg (FIG. 12A) and Mg|0.5 M Mg[B(HFIP)$_4$]$_2$-DGM|Mg (FIG. 12B) symmetric cell at 0.1 mA/cm².
Figure 12B:
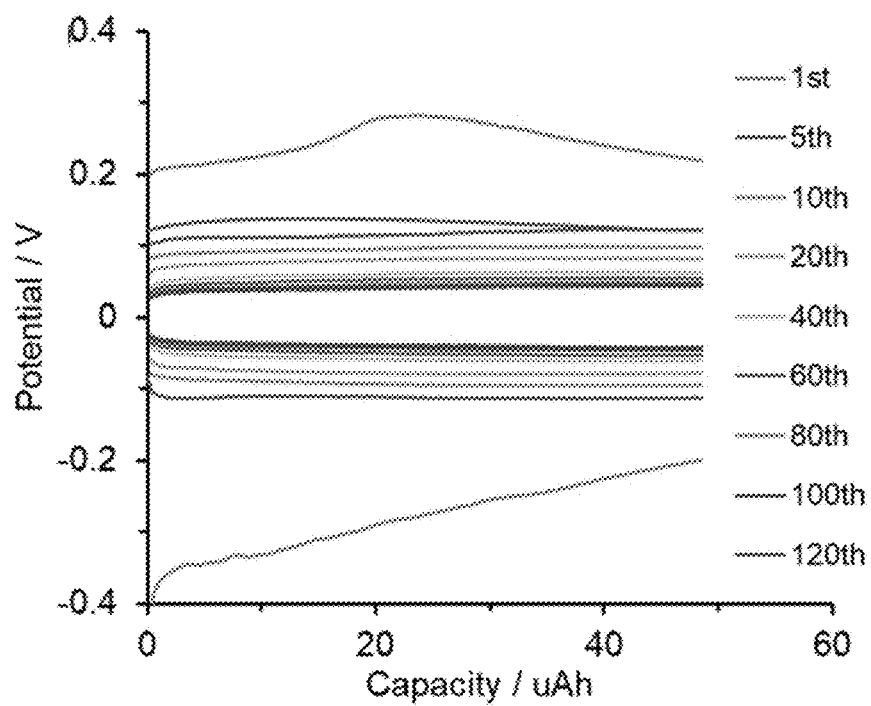
Figure 13A:
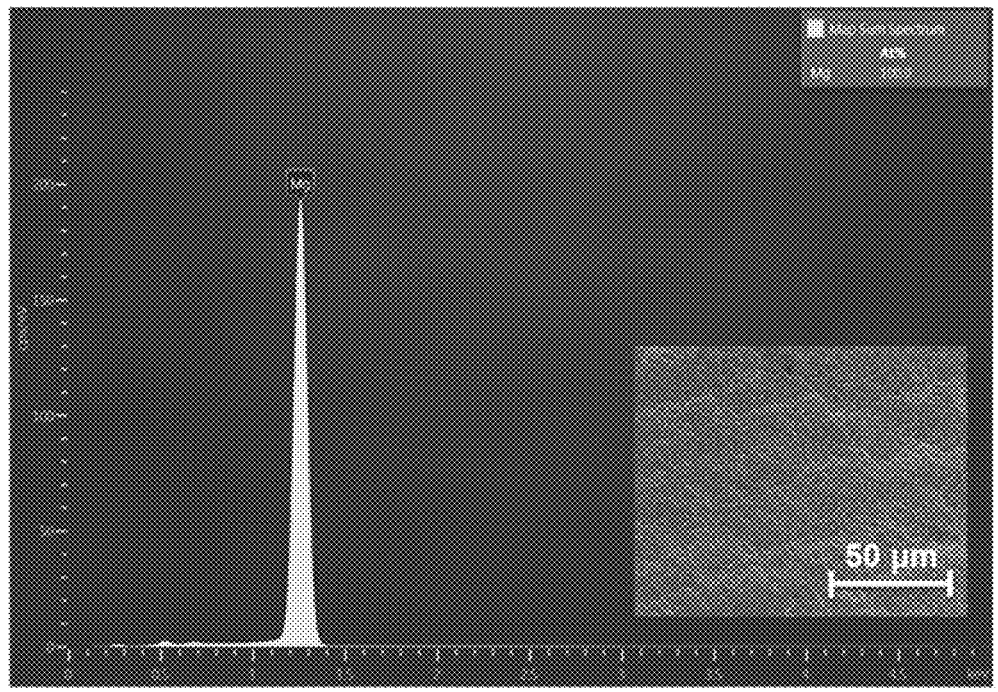
FIG. 13A and FIG. 13B show the energy-dispersive X-ray spectroscopy (EDX) spectra and scanning electron microscopy (SEM) images of electrochemical Mg metal deposition on the surface of Mo foil in 0.5 M Mg-FPB (FIG. 13A) and Mg[B(HFIP)$_4$]$_2$ (FIG. 13B) electrolytes. Electrolysis under 2.0 mA/cm² for 3 h, Mo foil as substrate.
Figure 13B:
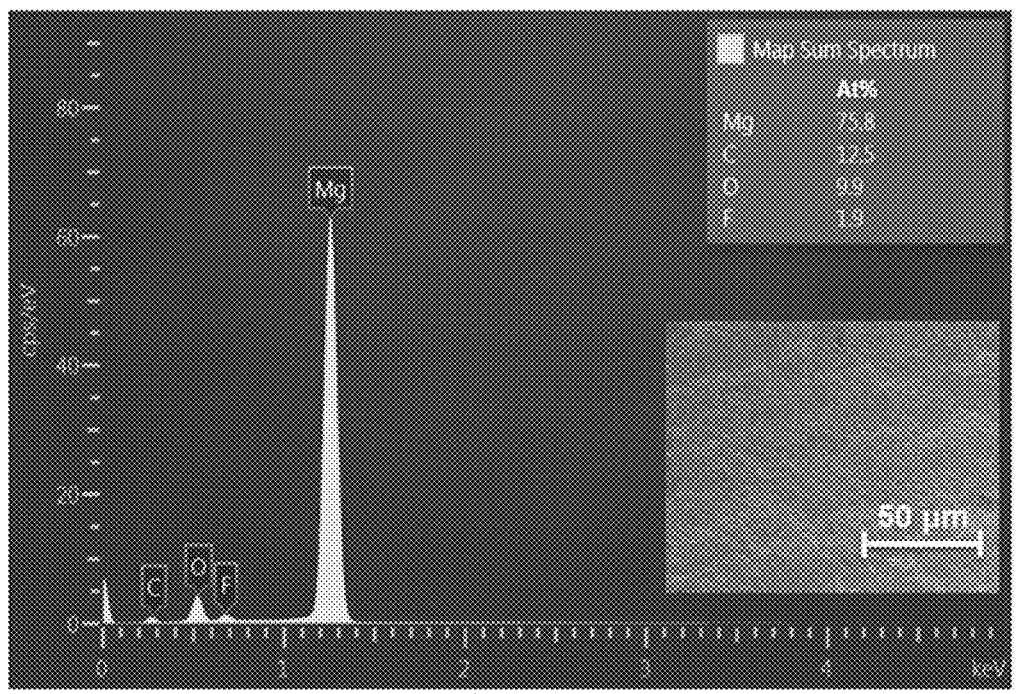

Furthermore, in the symmetric cell studies, the $Mg[B(HFIP)_4]_2$ electrolyte manifested much higher overpotential (FIGS. 11 and 12), which was consistent with previously reported observations. The $Mg[B(HFIP)_4]_2$ electrolyte took ~150 hours to reach comparable overpotential as Mg-FPB. In the bulky electrochemical Mg deposition studies, both Mg-FPB and $Mg[B(HFIP)_4]_2$ electrolytes yielded a smooth, dendrite free Mg layer (FIG. 13). However, the energy-dispersive X-ray spectroscopy (EDX) spectrum of the Mg layer deposited from $Mg[B(HFIP)_4]_2$, indicated 12.5% C, 9.9% 0, and 1.9% F. This result indicated that the electrochemical decomposition of the $[B(HFIP)_4]^-$ anion was during the Mg plating process. In contrast, the EDX spectrum of the Mg layer deposited from MgFPB-DGM electrolyte was very clean, only Mg metal was observed.

Figure 14:
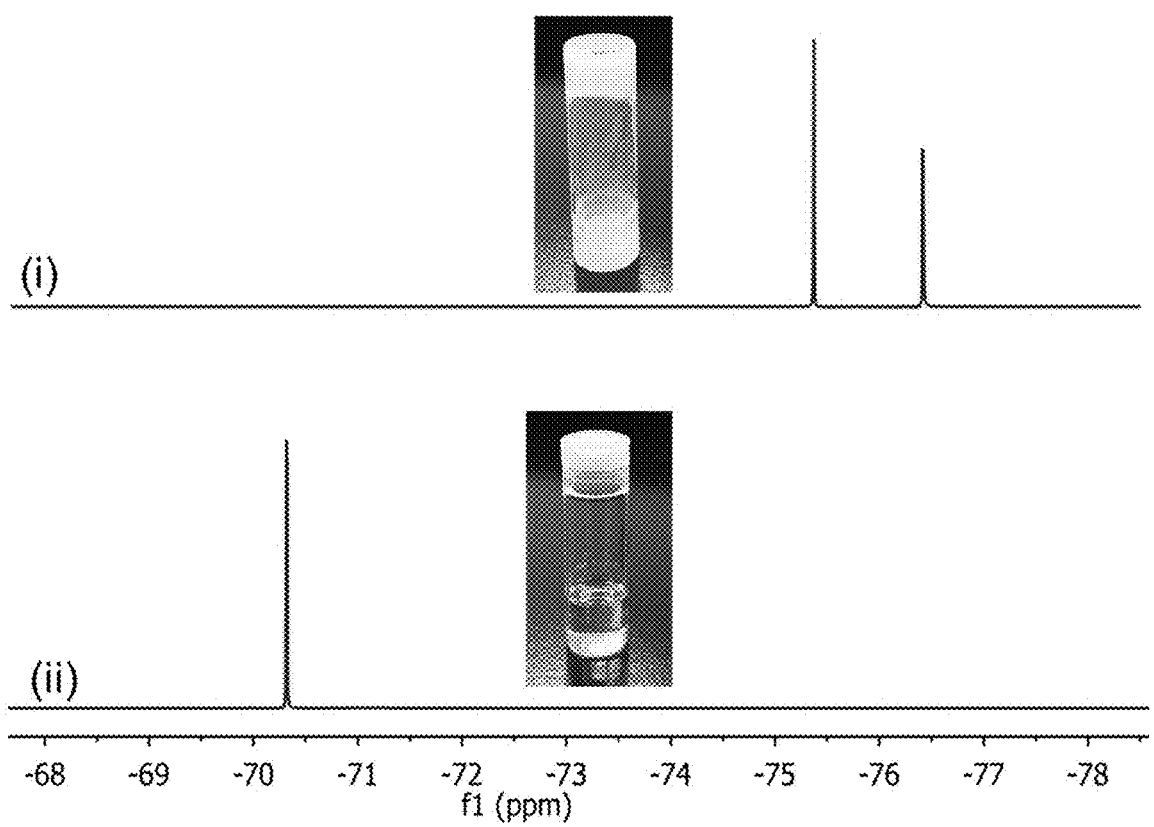
FIG. 14 shows the $^{19}$F-NMR spectrums and photographs of 0.5 M (i) Mg[B(HFIP)$_4$]$_2$-DGM and (ii) Mg-FPB-DGM electrolytes with 1% water treat for two days at room temperature.

In addition, the chemical stability of the Mg-FPB and $Mg[B(HFIP)_4]_2$ electrolytes was further compared by exposure to moisture (1% water added). As shown in FIG. 14, the Mg-FPB-DGM electrolyte remained a clean solution after water treatment for two days, and its $^{19}$F-NMR spectrum remained unchanged, which indicated the high chemical stability of FPB anion against hydrolysis. However, the $Mg[B(HFIP)_4]_2$ electrolyte was changed from clean solution to a white gel. A new signal at −76.45 ppm chemical shift was observed in the $^{19}$F-NMR spectrum which indicated the decomposition of the $[B(HFIP)_4]^-$ anion. The observed superior electrochemical and chemical stability of Mg-FPB over $Mg[B(HFIP)_4]_2$ was attributed to the stabilization effect of the perfluorinated pinacolato bidentate ligand. Without being bound by theory, the lower bond dissociation energy of the C—H bond (~400 kJ/mol for α-site C—H bond of alcohol and >500 kJ/mol for C-F bond in perfluorinated alkane), and an acidic proton in the alpha carbon of the HFIP substituent may be responsible for the inferior performance of the $Mg[B(HFIP)_4]_2$ electrolyte. The non-coordinating FPB counter anion delivered high chemical and electrochemical stability.

Example 5

Magnesium Ion Battery

Figure 15A:
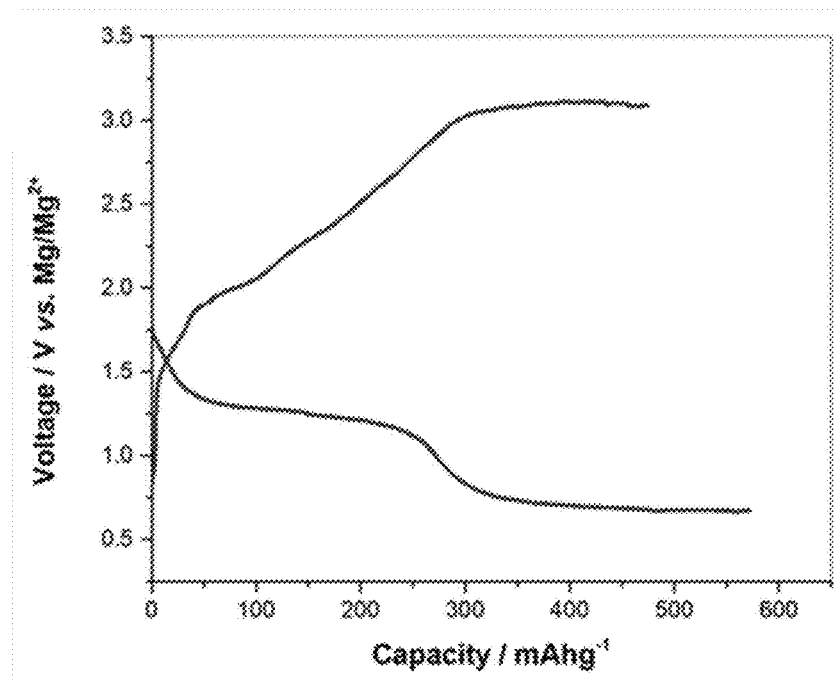
FIG. 15A and FIG. 15B are the charge/discharge curves of Mg—V$_2$O$_5$ battery using 0.5 M MMAC-DME electrolyte (FIG. 15A) and 0.5 M Mg-FPB electrolyte (FIG. 15B).
Figure 15B:
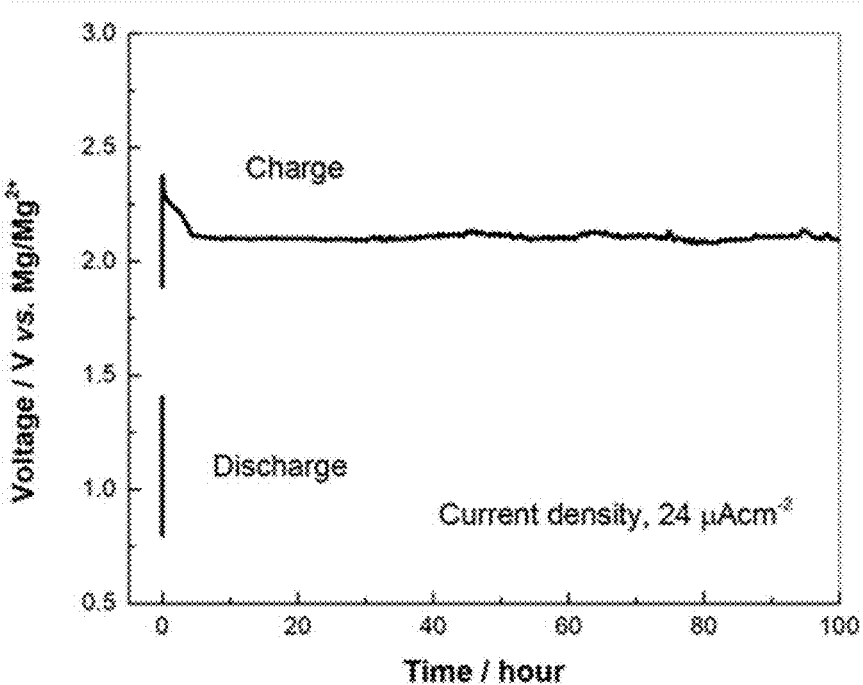

For the application of Mg-FPB electrolyte in a Mg ion battery, $V_2O_5$ was chosen as a first cathode material and a Mg disc was the anode material. Using Mg-FPB as electrolyte, the charge/discharge curves of the $Mg/V_2O_5$ Mg ion battery are shown in FIG. 15A. Two discharge plateaus were observed, and 580 mAh·g$^{-1}$ specific capacity was obtained. It confirmed the compatibility of Mg-FPB electrolyte to the $V_2O_5$ cathode material. As a comparison, the previously reported MMAC-DME electrolyte was applied in the Mg—$V_2O_5$ Mg ion battery at the same condition (FIG. 15B). However, a large irreversible charge profile was observed, and the battery almost did not show any discharge capacity.

Figure 16A:
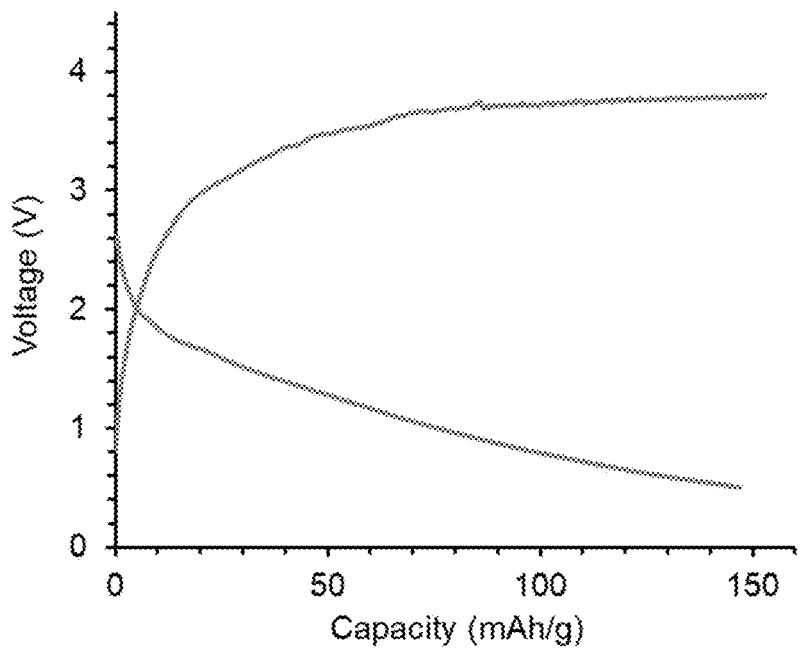
FIG. 16A and FIG. 16B are the initial charge/discharge curves (FIG. 16A) of Mg—MnO$_2$ battery using 0.5 M Mg-FPB-DGM electrolyte at 10 μA/g current density and cycling performance (FIG. 16B) of the Mg/MnO$_2$ Mg ion battery.
Figure 16B:
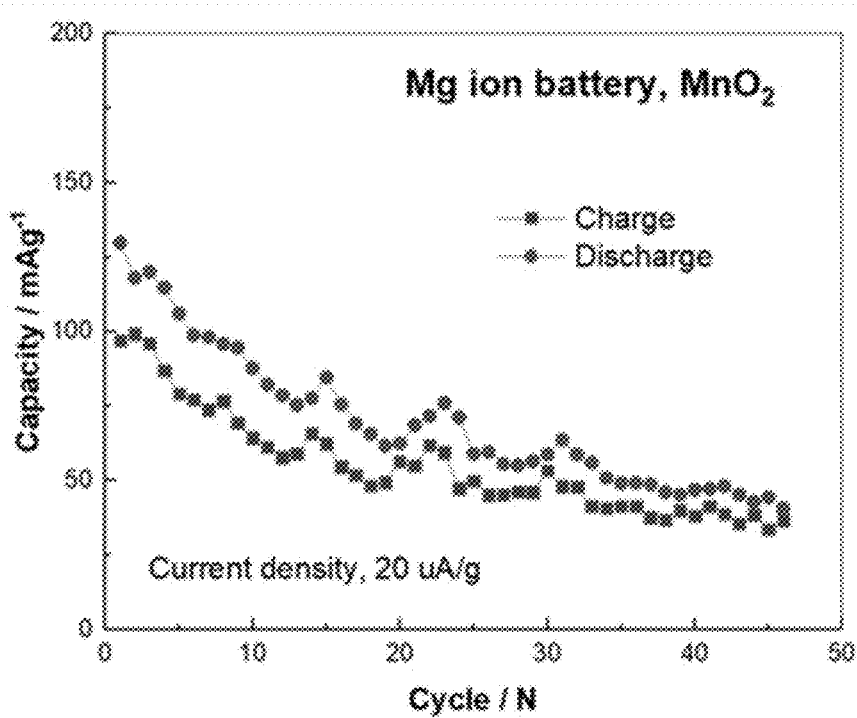
Figure 17:
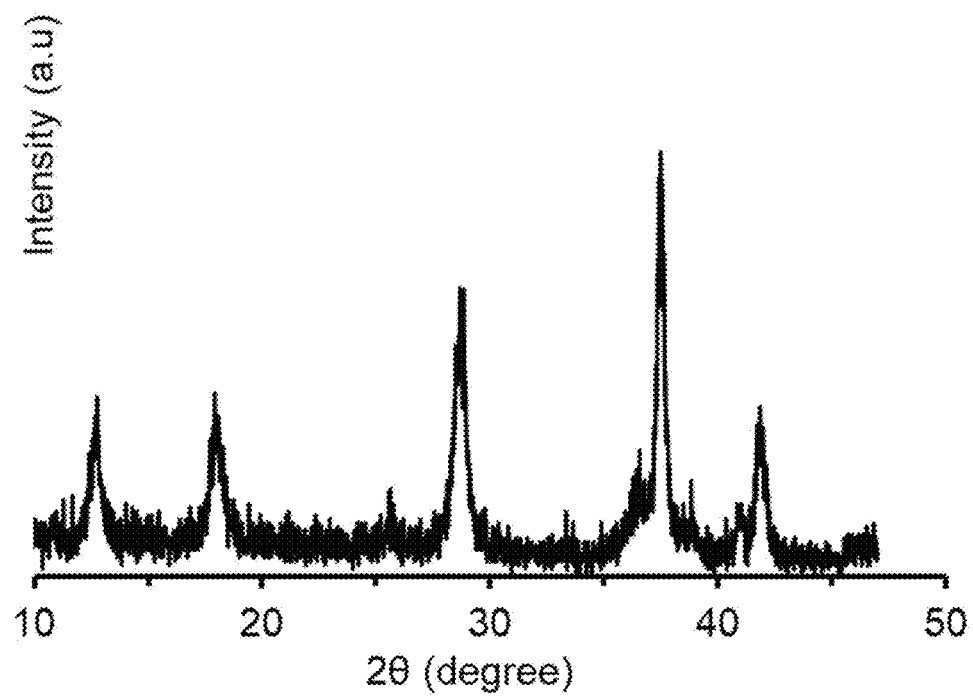
FIG. 17 shows the X-ray diffraction pattern of prepared α-MnO$_2$ cathode material.
Figure 18:
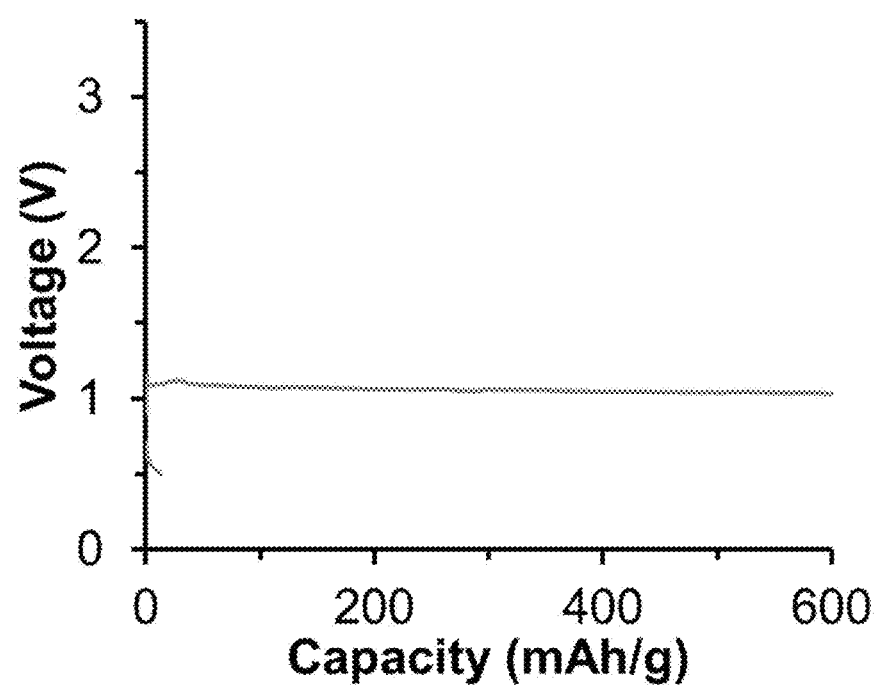
FIG. 18 is the charge-discharge curve of MnO$_2$ cathode with 0.5 M MMAC-DME electrolyte at 10 μA/g current density. In galvanostatic charge process, the cell voltage can't increase high than 1.1 V vs. Mg due to the corrosion of MMAC-DME electrolyte to the current collector.

Studies were also conducted with a $Mg/MnO_2$ battery to further demonstrate the high activity and anodic stability of the Mg-FPB electrolyte in Mg ion batteries. Due to the high anodic stability of the Mg-FPB electrolyte (>4.0 V vs. Mg), the $Mg/MnO_2$ battery was charged up to 3.9 V as shown in FIG. 16A. The Mg/MnO$_2$ Mg ion battery delivered 2.0 V battery voltage and 150 mAh·g$^{-1}$ discharge capacity at a current density of 10 µA·g$^{-1}$. Forty-seven cycle charge/discharge capacity, FIG. 16B, confirmed the rechargeability of the Mg/MnO$_2$ Mg ion battery. However, the Mg/MnO$_2$ battery using chlorides containing MMAC electrolyte could not charge and discharge due to the lower anodic stability and corrosion of electrolyte to the current collector (FIG. 18).

These studies indicated that the non-coordinating FPB-related anion electrolytes are easily synthesized and show excellent electrochemical performance in magnesium ion batteries.

Example 6

Mg—S and Mg—Se Batteries

After the reliability of the Mg-FPB electrolyte was determined in the Mg ion battery, its capability was further studied in the Mg—S and Mg—Se battery application. In order to reduce the shuttle effect that may result from the dissolving of the poly-sulfide during the battery charge/discharge process, 1.0 M of pyr14-FPB ionic liquid was added into the 0.5 M Mg-FPB-diglyme electrolyte. The preparation of the new electrolyte with ionic liquid was completed as shown in Scheme 2.

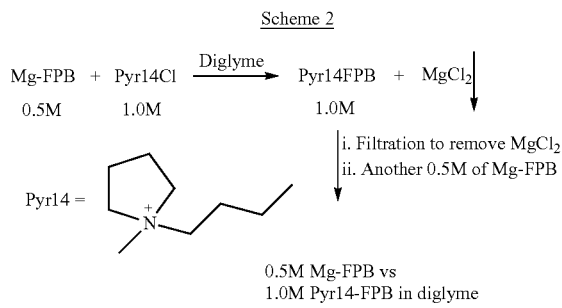

The Pyr14-FPB ionic liquid was prepared through one step ion exchange reaction from Mg-FPB and Pyr14Cl. After removing the MgCl$_2$ precipitate and adding extra Mg-FPB electrolyte, the Mg-FPB-Pyr14Cl electrolyte was obtained as colorless clear solution.

Figure 19A:
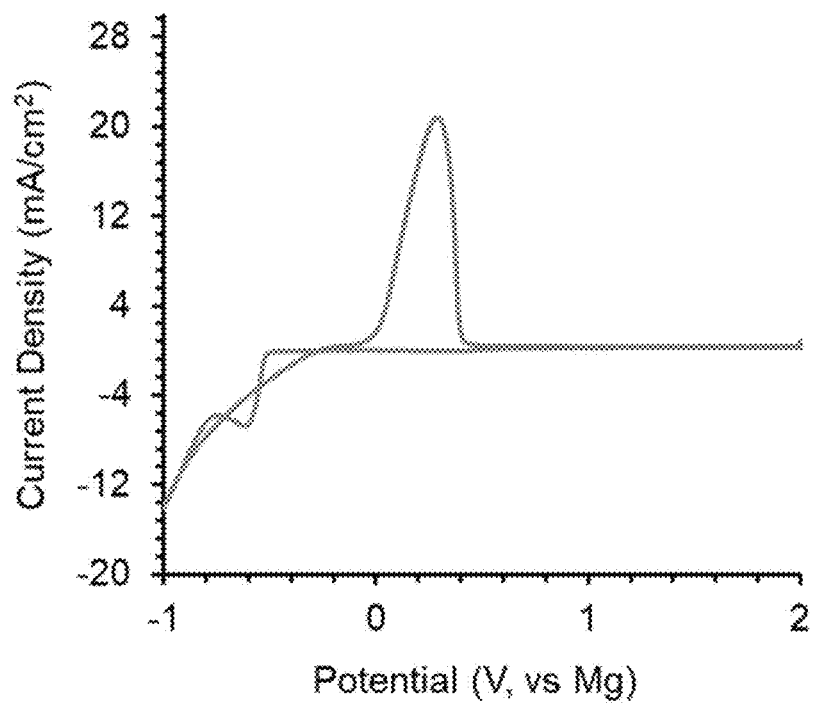
FIG. 19A, FIG. 19B, and FIG. 19C are graphs showing the CV curve of the 0.5 M Mg-FPB electrolyte with 1.0 M Pyr14-FPB additive in diglyme (FIG. 19A), anodic LSV curves of the Mg—FPB-Pyr14-FPB electrolyte (FIG. 19B) and plots of charge over time of the Mg deposition and stripping of the Mg-FPB-Pyr14-FPB electrolytes (FIG. 19C). GC as working electrode, Mg as reference and counter electrode, 50 mV/s scan rate.
Figure 19B:
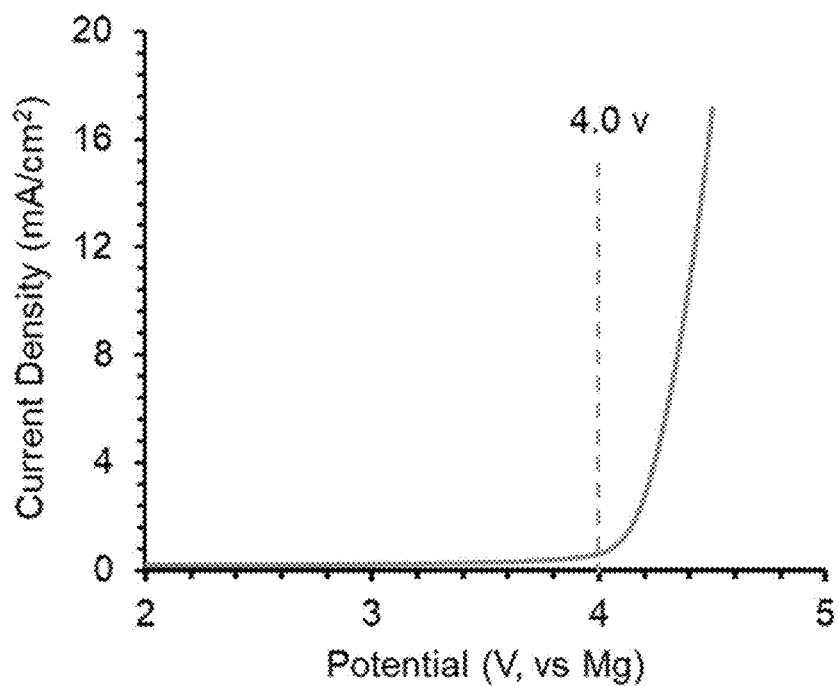
Figure 19C:
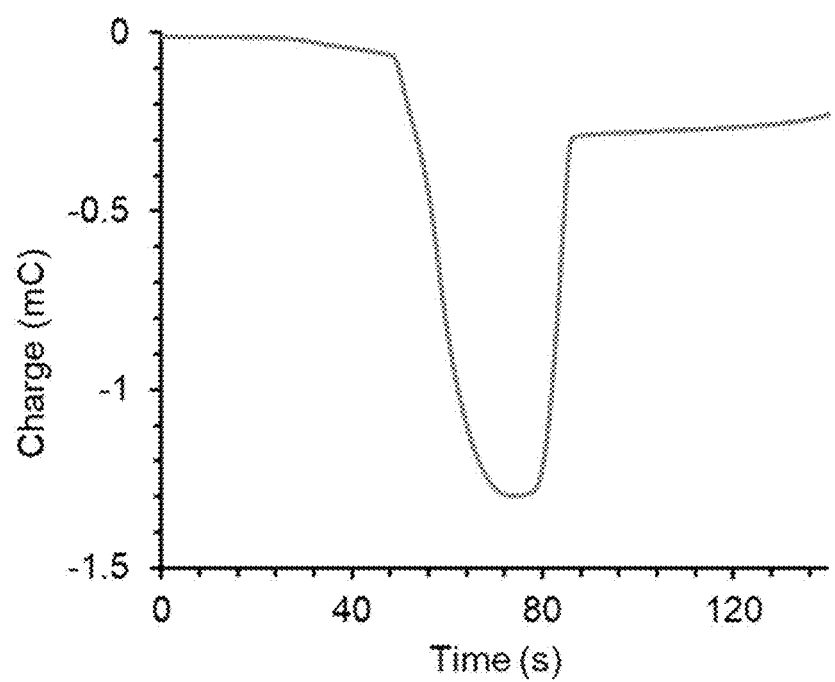

The electrochemical performance of the Mg-FPB-Pyr14Cl electrolyte was investigated by CV scan. As shown in FIG. 19, the Mg-FPB-Pyr14Cl electrolyte delivered reliable reversibility for Mg plating/stripping, specifically, 181 mV overpotential, 80% Coulombic efficiency, and −0.453V Mg deposition onset potential. The anodic stability of the electrolyte was as high as 4.0 V vs. Mg.

Figure 20:
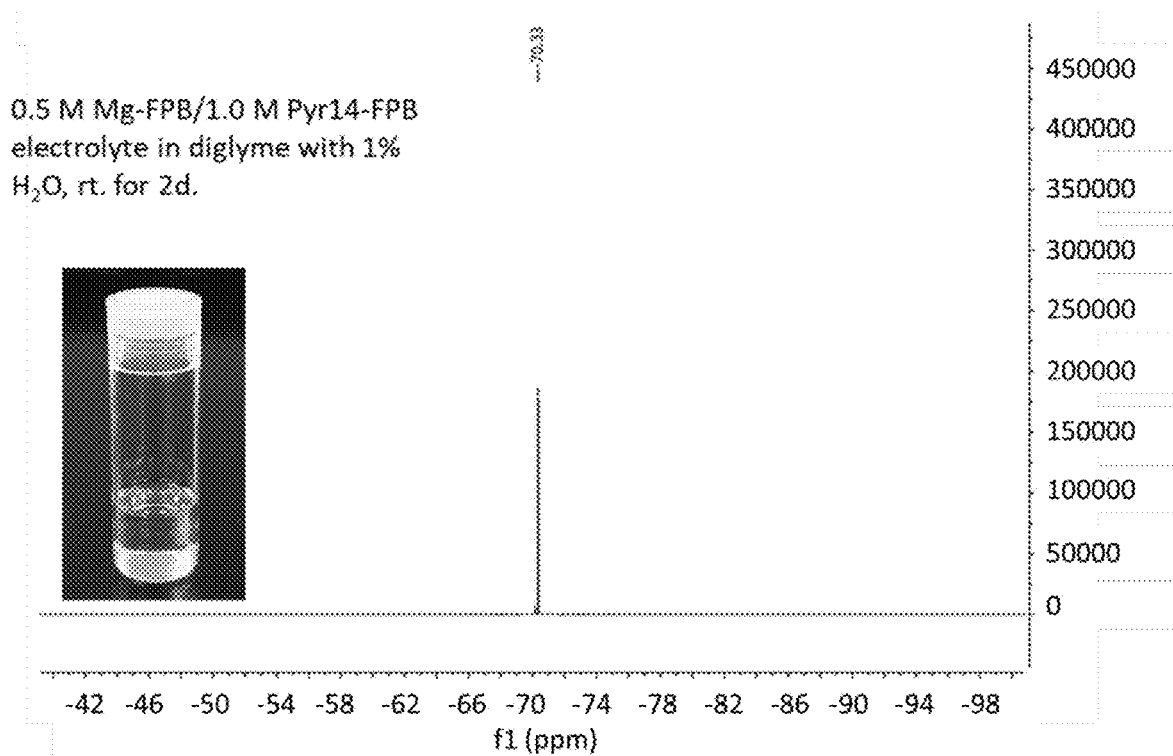
FIG. 20 shows $^{19}$F-NMR spectrum and photograph of Mg-FPB-Pyr14-FPB electrolyte with 1% water treatment for two days.

The stability of the Mg-FPB-Pyr14Cl electrolyte was also studied by water treatment. As shown in FIG. 20, in the presence of 1% water over 2 days, the Mg-FPB-Pyr14Cl electrolyte remained a clean solution and its $^{19}$F-NMR spectrum was unchanged.

Figure 21A:
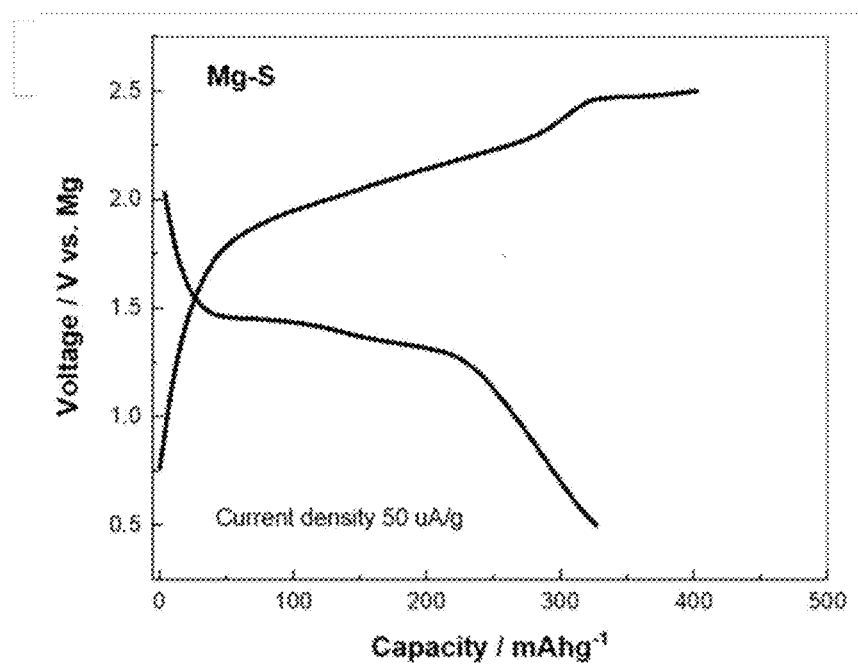
FIG. 21A and FIG. 21B are graphs showing the charge/discharge curves of Mg—S battery using 0.5 M Mg-FPB electrolyte, Mg disc anode, and S@CNT (sulfur loaded carbon nanotubes) cathode (FIG. 21A), and the cycling performance if the Mg—S battery (FIG. 21B).
Figure 21B:
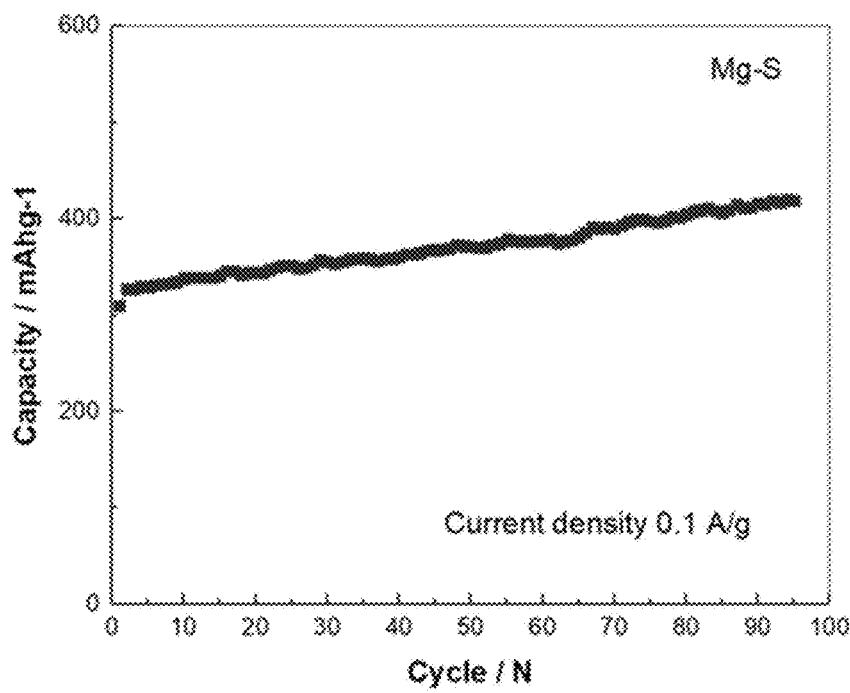

Sulfur was loaded on the carbon nanotubes (S@CNT) and used as cathode material in the Mg—S battery. As shown in FIG. 21A, the charge plateau and discharge plateau were 1.4 V and 2.1 V in average, respectively. The Mg—S battery delivered 330 mAh·g$^{-1}$ discharge capacity in the first charge/discharge cycle. The discharge capacity of the battery keeps increasing from the first cycle to the 95th cycle (FIG. 21B).

Figure 22A:
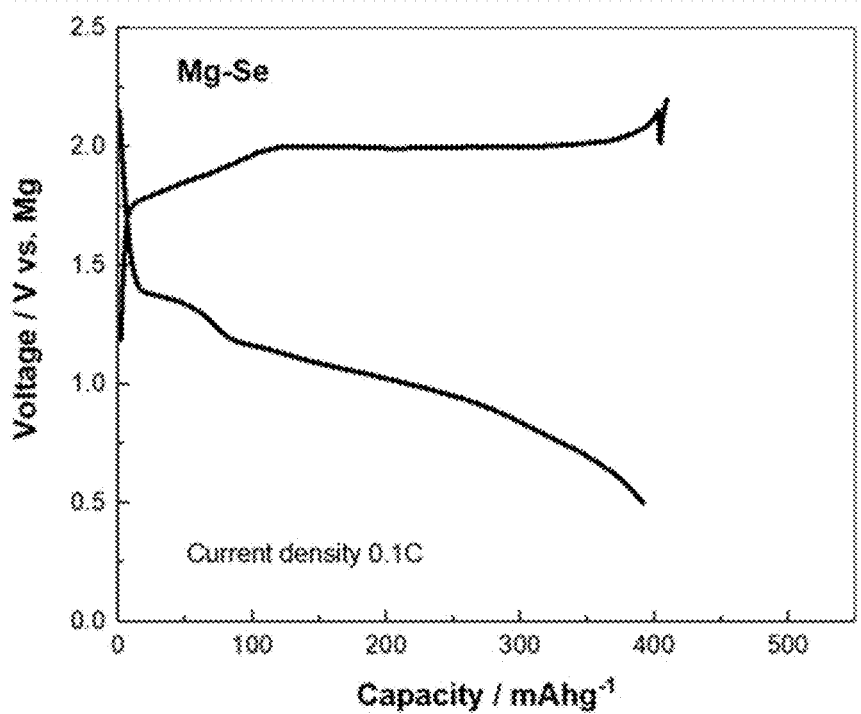
FIG. 22A and FIG. 22B are graphs showing the charge/discharge curves of Mg—Se battery using 0.5 M Mg-FPB electrolyte, Mg disc anode, and S/CMK cathode (FIG. 22A); and the cycling performance if the Mg—Se battery (FIG. 22B).
Figure 22B:
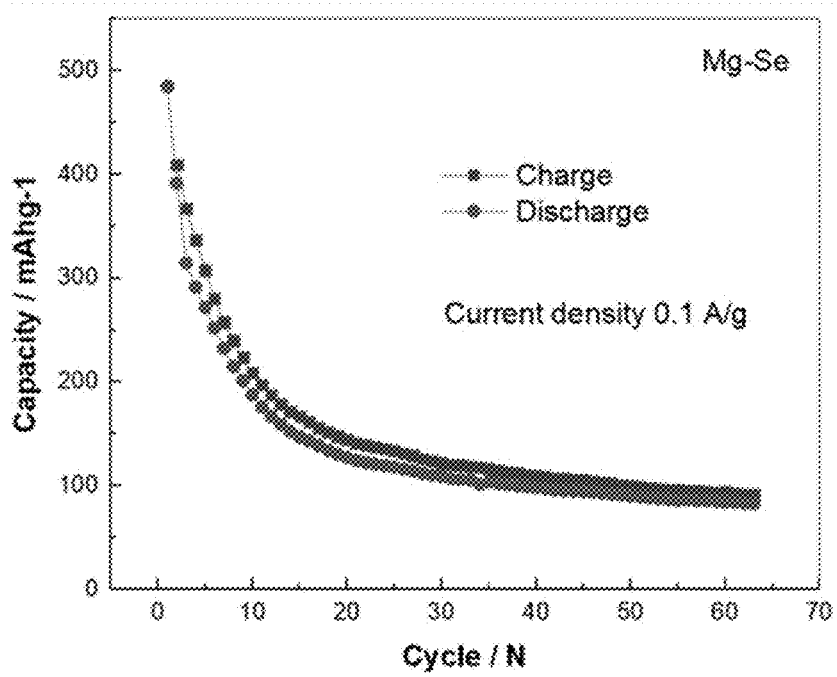

The Mg—Se battery was demonstrated by using Se/CMK as cathode material. The Mg—Se battery delivered 1.6V voltage and 400 mAh·g$^{-1}$ discharge capacity (FIG. 22). However, decay of battery capacity was observed during the cycling process.

Example 7

FPB-Based Alkaline or Alkaline Earth Metal Salts

The FPB-based alkaline or alkaline earth metal salts, such as Li-FPB, Na-FPB, K-FPB, and Ca-FPB were prepared as shown in Scheme 3. These salts may be useful for energy storage.

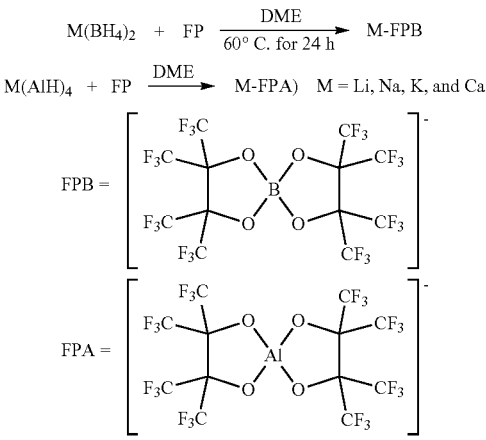

Figure 23:
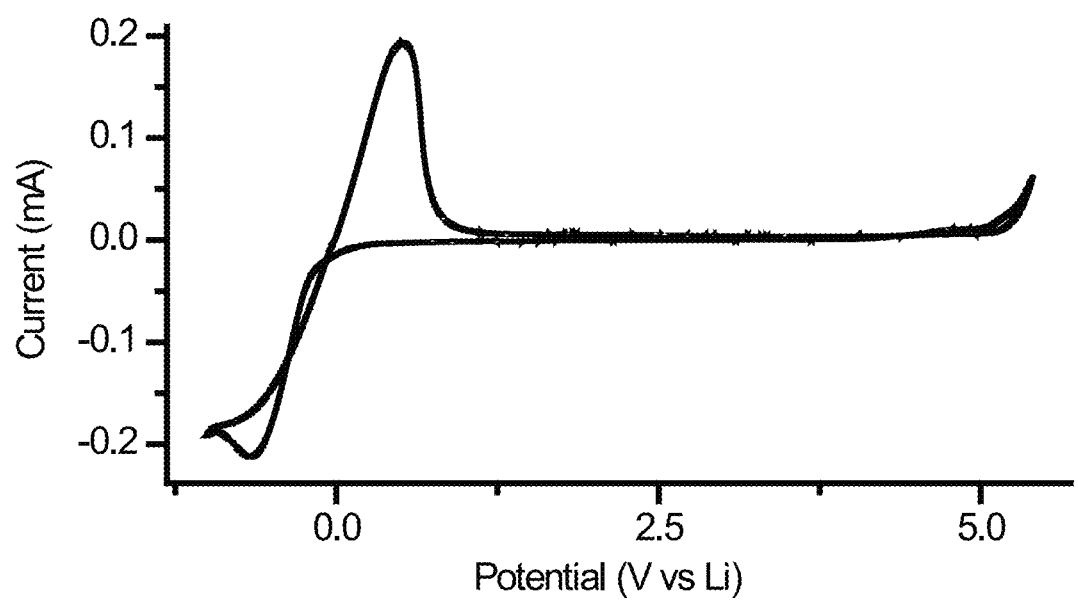
FIG. 23 is the CV curve of 0.2 M Li-FPB in DC/DMC 1:1 solution. GC as working electrode, Mg as reference and counter electrode, 50 mV/s scan rate.

The CV curve of 0.2 M Li-FPB in DC/DMC 1:1 solution was shown in FIG. 23. Due to the high stability and mild properties of FPB anion, the anodic stability is high as 5.1V. The high anodic stability of the Li-FPB electrolyte displayed its application in high voltage Li ion batteries.

Example 8

Mixture of Mg-FPB and other Mg-based Salts

Figure 24A:
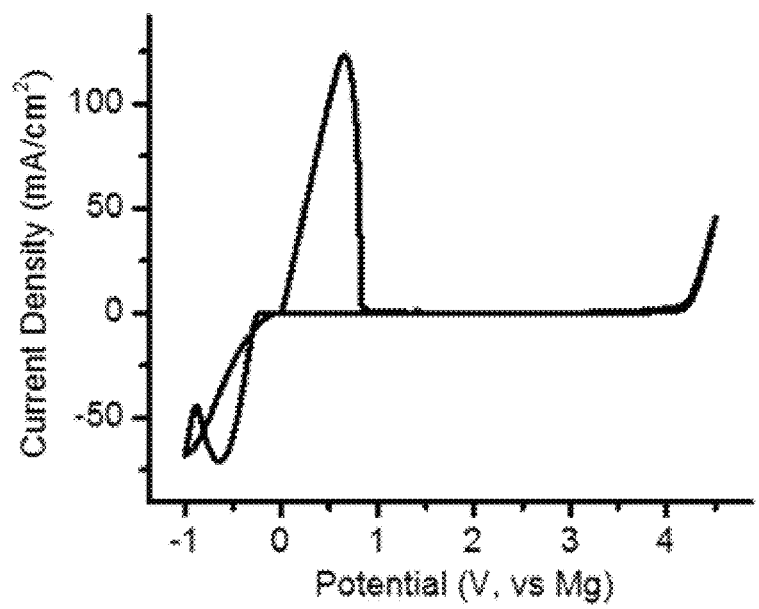
FIG. 24A and FIG. 24B are CV curves of Mg-FPB—MgCl$_2$ mixed electrolytes in DGM under 1:1 ratio (FIG. 24A) and 1:2 ratio (FIG. 24B).
Figure 24B:
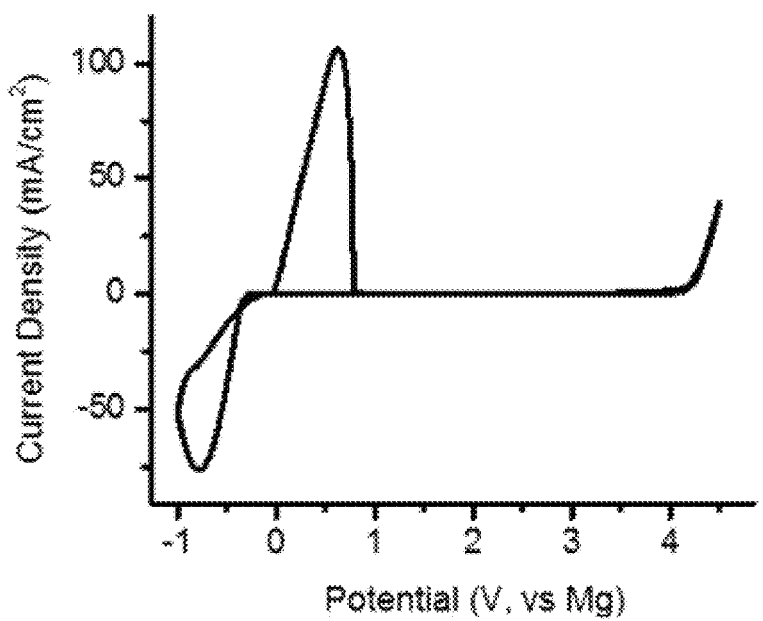

Not only the pure Mg-FPB electrolyte can be used as Mg$^{2+}$ cation conductive electrolyte for battery applications, the mixture of Mg-FPB and other Mg-based salts can also support highly reversible Mg plating/stripping. A [(µ-Cl)$_3$Mg$_2$]$^+$ dimer was formed from the reaction between Mg-FPB and MgCl$_2$, as shown in Scheme 4. This Mg-FPB-MgCl2 electrolyte showed up to 0.6 M [Mg] solubility and delivered perfect electrochemical perfect electrochemical performance under both a 1:1 and 1:2 ratio of Mg-FPB and MgCl$_2$ in DGM. As shown in FIG. 24A and FIG. 24B, the solution with 0.3 M of Mg-FPB and 0.3 M MgCl2 delivered 136 mV overpotential and 90% Coulombic efficiency. When the ratio between Mg-FPB and MgCl$_2$ was decreased to 1:2 (0.2 M Mg-FPB and 0.4 M MgCl$_2$), the overpotential was decreased to 108 mV and the Coulombic efficiency was increased to 97%. The anodic stabilities of the electrolytes were both greater than 4.0 V vs Mg under both a 1:1 and 1:2 ratio of Mg-FPB and MgCl$_2$.

Scheme 4

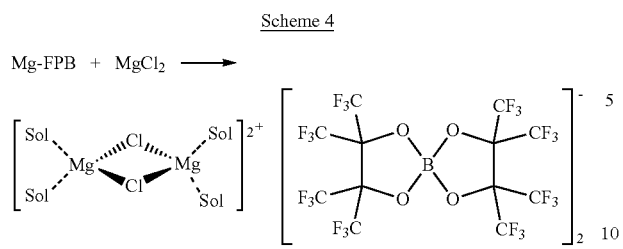

Example 9

Use of Other Monodentate Fluorinated Alcohols

Beside the bidentate perfluorinated pinacol, (hexafluoro-2,3-ditrifluoromethyl-2,3-butanediol), other monodentate fluorinated alcohols, such as 2,2,2-trifluoroethanol (TFE), 1,1,1,3,3,3-hexafluoro-2-methyl-2-propanol (HFMP), and nonafluoro-tert-butyl alcohol (FTBA), was also used to react with alkaline metal or alkaline earth metal tetrahydridoborate ([BH4]-) or tetrahydroaluminate ([AlH$_4$]$^-$). As shown in Scheme 5, the monodentate fluorinated alcohols were reacted with Mg(BH$_4$)$_2$ in DME solvent. After stirring the mixtures at 50° C. for 24 h, the Mg-TFEB, Mg-HFMPB, and Mg-FTBB were obtained by removing the solvent and excess alcohol starting materials. In the cases of LiBH4, the reaction mixture was refluxed in DME/toluene (1:10) mixed solution for 4.5 h. In the case of NaBH$_4$ and KBH$_4$, the reaction mixtures were refluxed in DME for 4 h. And in the case of NaAlH$_4$, the reaction mixture was refluxed in hexane for 4 h. The reaction conditions were summarized in Table 2.

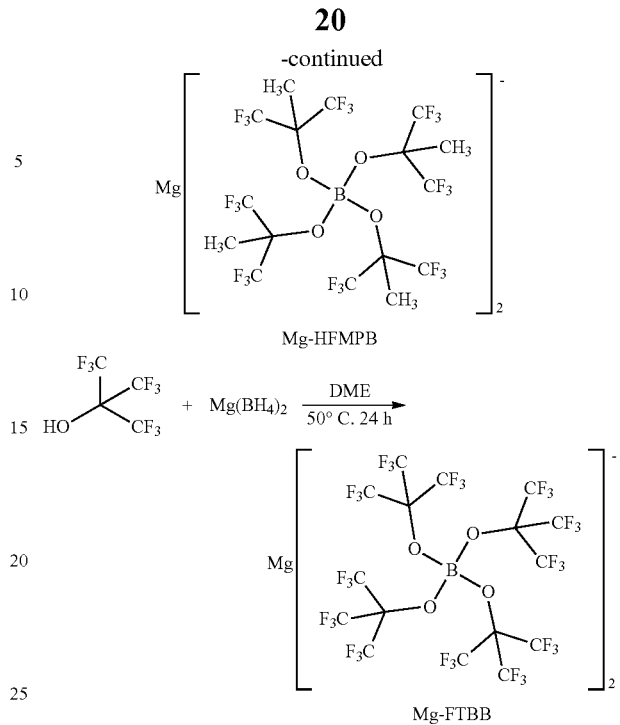

Scheme 5

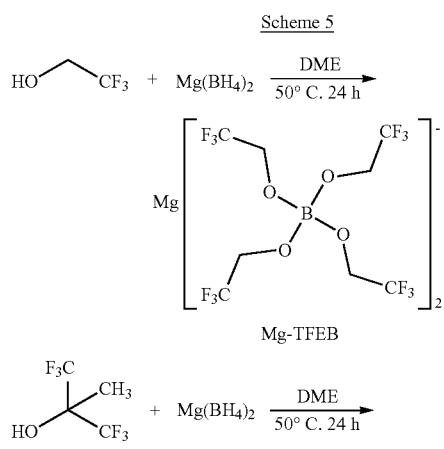

TABLE 2

Reaction conditions between alkaline metal or alkaline earth metal tetrahydroborate ([BH$_4$]$^-$) or tetrahydroaluminate ([AlH$_4$]$^-$) and fluorinated alcohols

| | BH$_4^-$ | AlH$_4^-$ |
|---|---|---|
| Li | Refluxed in DME/toluene (1:10) for 4.5 h | Room temperature in DME for 24 h |
| Na | Refluxed in DME for 6 h | Refluxed in hexane for 6 h |
| K | Refluxed in DME for 4 h | Refluxed in hexane for 6 h |
| Mg | 50° C. in DME for 24 h | Room temperature in DME for 24 h |
| Ca | 70° C. in DME for 24 h | Room temperature in DME for 24 h |

Figure 25A:
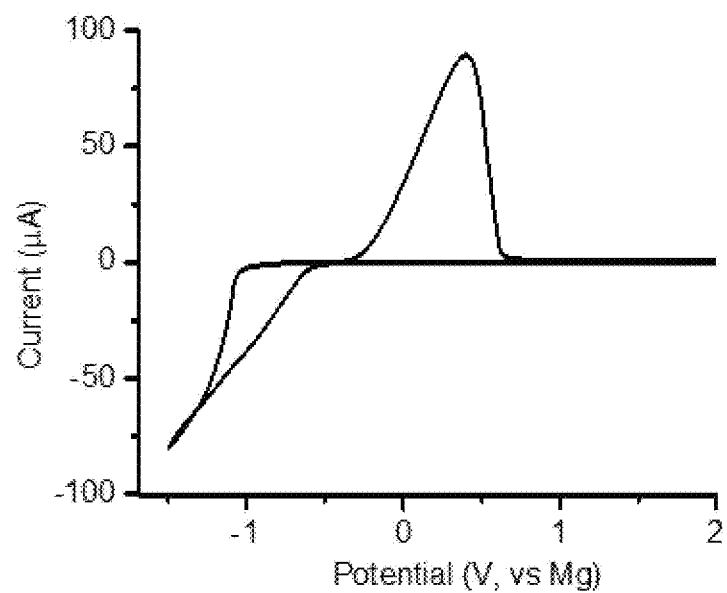
FIG. 25A and FIG. 25B are CV curves of 0.1 M Mg-HFMPB in DME (FIG. 25A) and 0.1 M Mg-FTBB in DME (FIG. 25B).
Figure 25B:
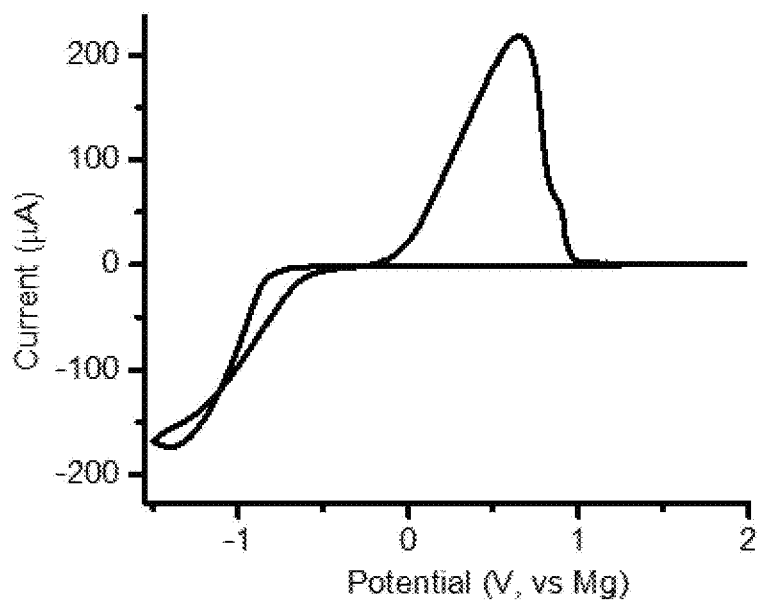

The electrochemical performance of the Mg-HFMPB and Mg-FTBB electrolytes was studied by CV measurements. The Mg-HFMPB electrolyte delivered good reversibility for Mg deposition/stripping. In a CV curve of 0.1 M Mg-HFMPB in DME (FIG. 25A), the electrolyte displayed 71% Coulombic efficiency and 375 mV overpotential. In the case of the Mg-FTBB electrolyte, a similar level of performance was observed. As shown in the FIG. 25B, 0.1 M Mg-FTBB in DME delivered 72% Coulombic efficiency and 409 mV overpotential.

Figure 26A:
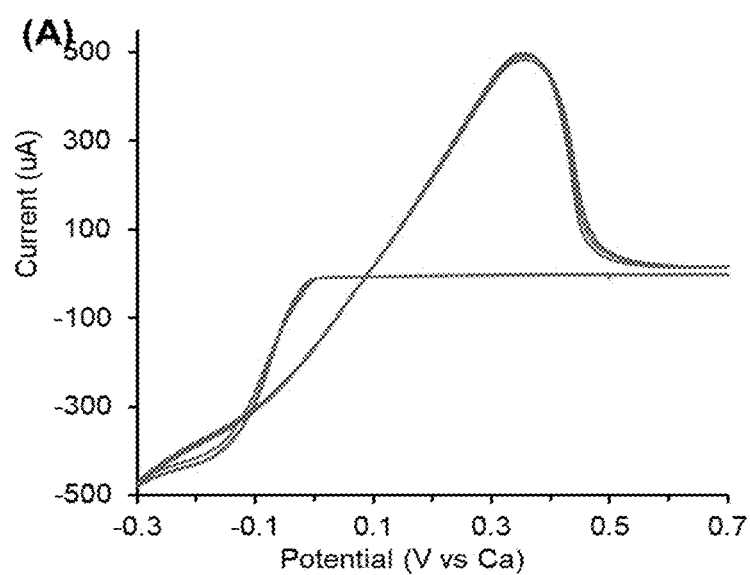
FIG. 26A and FIG. 26B are CV curves of the Ca(B(HFIP)$_4$)$_2$ (FIG. 26A) and Ca-FPB (FIG. 26B) electrolytes in DME (1-10 cycles).
Figure 26B:
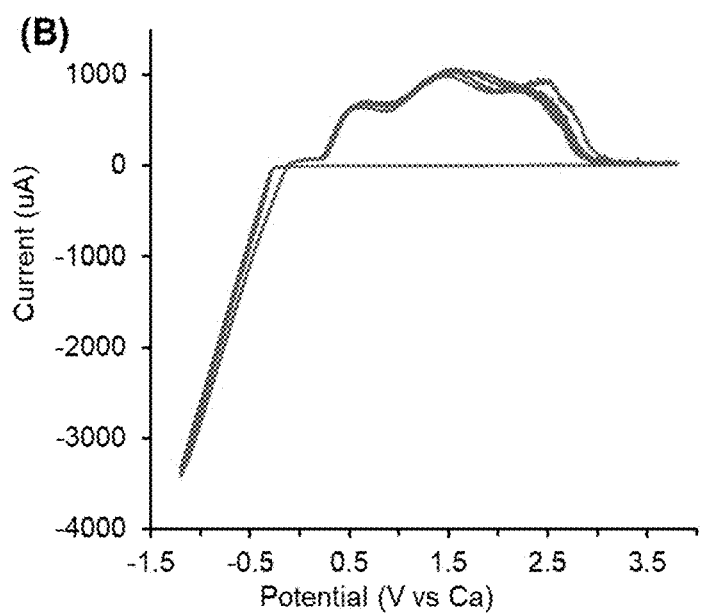

The electrochemical performance of the Ca(B(HFIP)$_4$)$_2$ and Ca-FPB electrolytes was studied by CV measurement as well. Both of the delivered reversible deposition/stripping behavers. As shown in FIG. 26A, the Ca(B(HFIP)$_4$)$_2$ in DME electrolyte displayed 67% Coulombic efficiency and 85 mV overpotential which is the smallest overpotential among all the borate-based electrolytes reported herein. Similarly, the Mg-FPB in DME electrolyte delivered 64% Coulombic efficiency and 148 mV overpotential. However, the stripping peak of the Mg-FPB in DME electrolyte is much broader than that of Ca(B(HFIP)$_4$)$_2$ in DME electrolyte.

Figure 27:
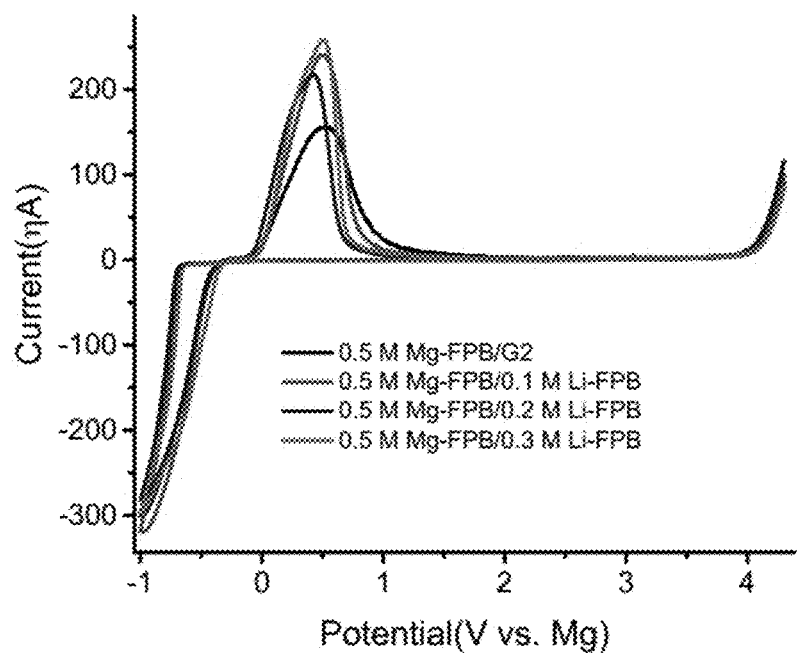
FIG. 27 shows the CV curves of 0.5 M Mg-FPB electrolyte in DGM with the addition of 0~0.3 M Li-FPB.
Figure 28:
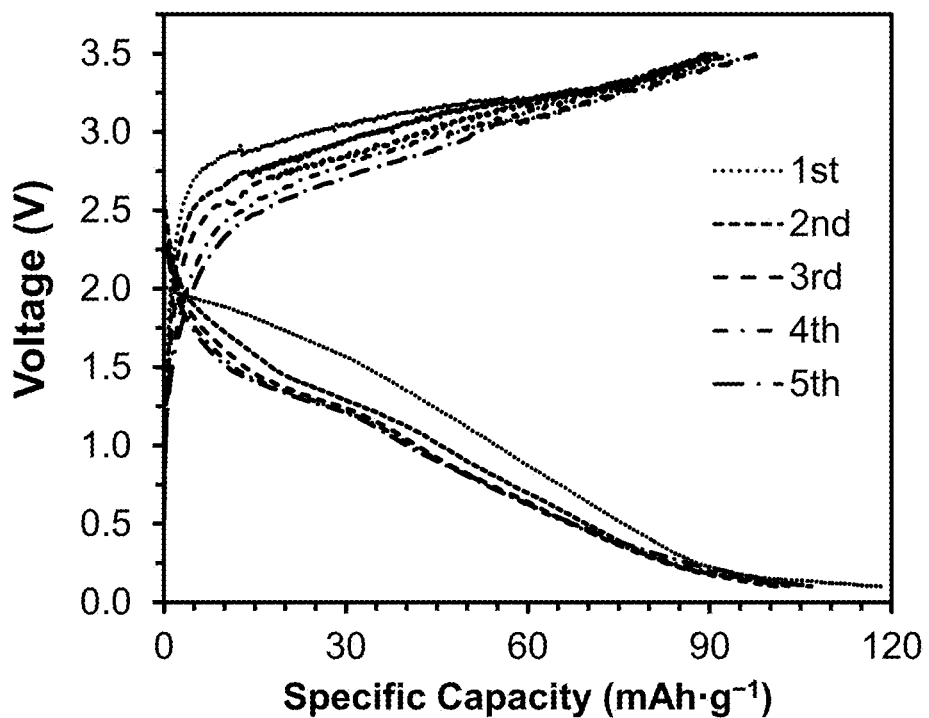
FIG. 28 shows charge/discharge profiles of Mg/α-V$_2$O$_5$ battery using 0.5 M MgFPB/diglyme electrolyte. The active material loading of 10 nm α-V$_2$O$_5$ is 0.686 mg. The current density applied is 5.0 mA·g$^{-1}$. Theoretical capacity of α-V$_2$O$_5$ is 295 mAh·g$^{-1}$. Battery working potential window is 0.1~3.5 V.
Figure 29:
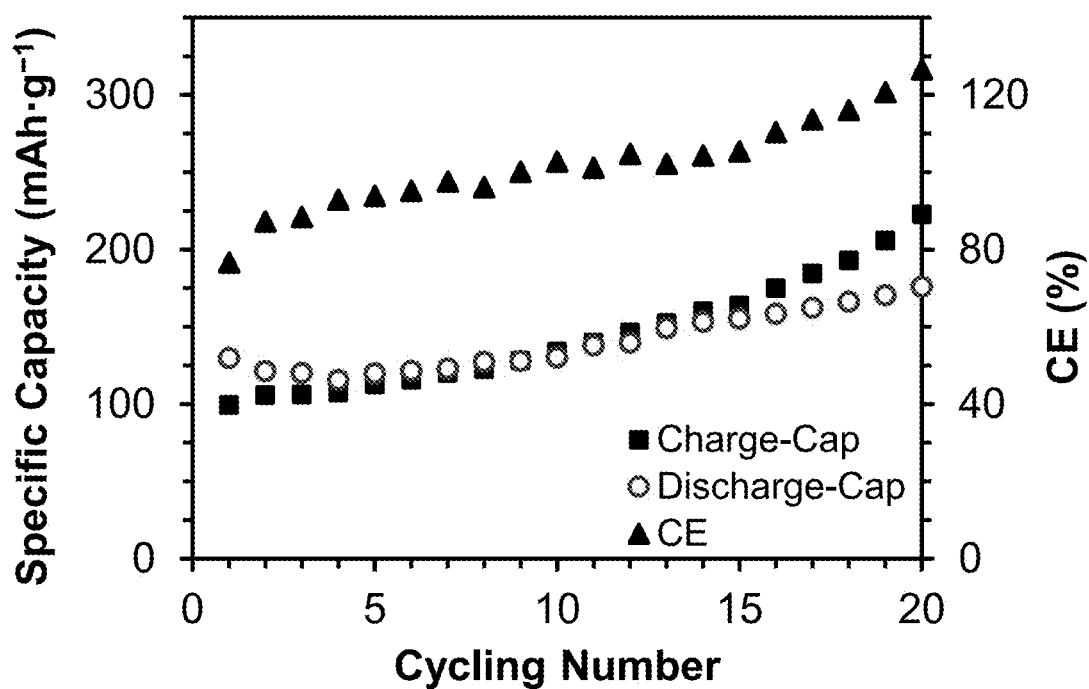
FIG. 29 shows capacity retention of Mg/α-V$_2$O$_5$ battery using 0.5 M MgFPB/diglyme electrolyte. In the cycling figure, the mass loading is 0.63 mg. The current density is 0.05 C (1 C=295 mA·g$^{-1}$) or the current is 9.29 μA. Working voltage window is 0.1~3.5 V. Coulombic efficiency (CE) is defined as charge capacity divided by discharge capacity.

The alkaline metal or alkaline earth metal borate or aluminate electrolytes (Mg$^{2+}$, Li$^+$, Na$^+$, K$^+$, Ca$^{2+}$, etc) may be mixed with other salts, such as MCl, M(TFSI), M(BF$_4$), M(PF$_6$), etc. (M=Mg$^{2+}$, Li$^+$, Na$^+$, Ca$^{2+}$, etc), under any ratio for battery applications. The alkaline metal or alkaline earth metal borate or aluminate electrolytes may also be mixed with each other or used as additive for battery applications. For example, as shown in FIG. 27, when Li-FPB was added into the solution of 0.5 M Mg-FPB electrolyte, the electrochemical reactivity Mg deposition/stripping was improved with the concentration of Li-FPB increase from 0 to 0.3 M. The mixture of Mg-FPB and Li-FPB may be used as Mg conductive electrolyte for Mg battery. The solvent may be any organic solvent, such as THF, DME, diglyme, triglyme, PC, DEC, et al. When preparing the electrolytes, the salt and solvent may be pure or mixture of the aforementioned salts and solvents.

Example 10

Perfluorinated Chelate Anion Raises the Voltage Stability for Ca Batteries

Figure 30:
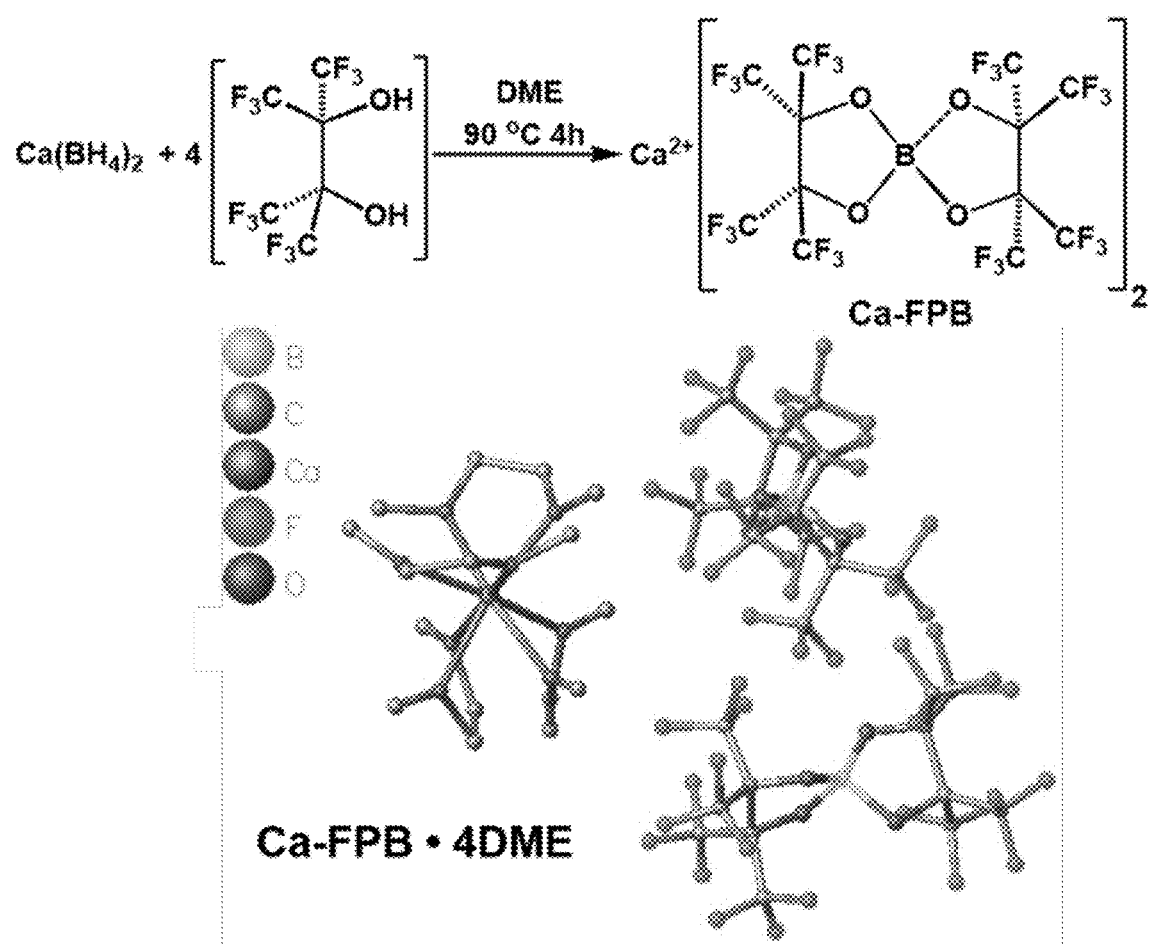
FIG. 30 shows the synthesis and crystal structure of Ca-FPB (Ca, green; B, blue; 0, red; C, gray; F, yellow).

Ca[B(O$_2$C$_2$(CF$_3$)$_4$)$_2$]$_2$ abbreviated as Ca-FPB was prepared from Calcium Borohydride and two equivalents hexafluoro-2,3-bis(trifluoromethyl)-2,3-butanediol were reacted in DME first at room temperature then at reflux for four hours. The solvent was removed under reduced pressure to afford a white microcrystalline solid. $^{19}$F and $^{11}$B NMR spectra of the sample each contained only one signal confirming uniform product distribution. Single crystals suitable for X-ray diffraction were obtained reliably by slow evaporation of solvent from a concentrated solution at room temperature. Results from X-ray diffraction and elemental analysis confirmed the formula as C$_{40}$B$_2$O$_{16}$F$_{48}$Ca equivalent to Ca(FPB)$_2$.4DME (M=1.750 g/mol). The structure was solved in the tetragonal, space group P4cc with lattice parameter a=14.8309(2) Å, c=28.5783(5) Å and volume (V=6286.0(2) Å$^3$) (FIG. 30). The Ca$^{2+}$ ions are coordinated to four chelating oxygens of DME solvent in a distorted square antiprismatic geometry. The charge is balanced by two tetrahedral FPB anions.

Figure 31A:
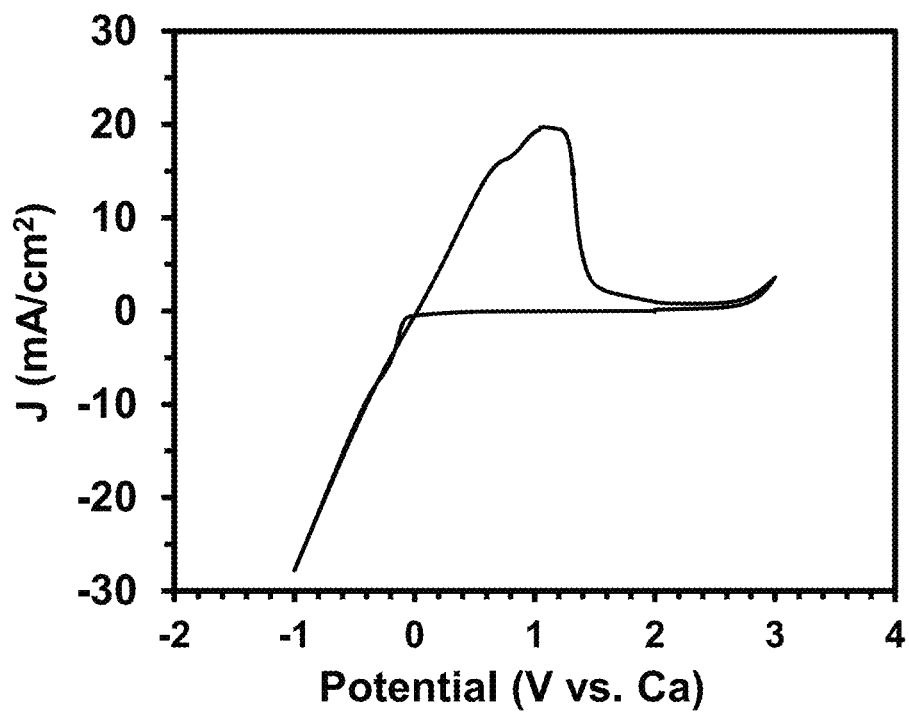
FIG. 31A shows electrochemical analysis of a 0.8 M Ca-FPB electrolyte by cyclic voltammetry with Pt working, Ca reference, and glassy carbon rod counter electrodes. Scan rate 100 mV/s.

Ca(FPB)$_2$ crystals were dissolved in DME to conduct electrochemical studies due to the high solubility (up to 0.8M) and high ionic conductivity (8.21 mS cm$^{-1}$) afforded by this solvent. Cyclic voltammetry (CV) was conducted at room temperature with a Pt electrode to test the ability of Ca(FPB)$_2$/DME electrolyte to deposit and strip Ca at the surface while avoiding possible alloying reactions. As shown in FIG. 31A, the Ca(FPB)$_2$ electrolyte displayed reversible deposition/stripping behavior with an almost negligible overpotential for deposition (15 mV) and stripping (5 mV). The very minimal observed overpotentials are beneficial due to improved deposition/stripping energy efficiency.

Figure 31B:
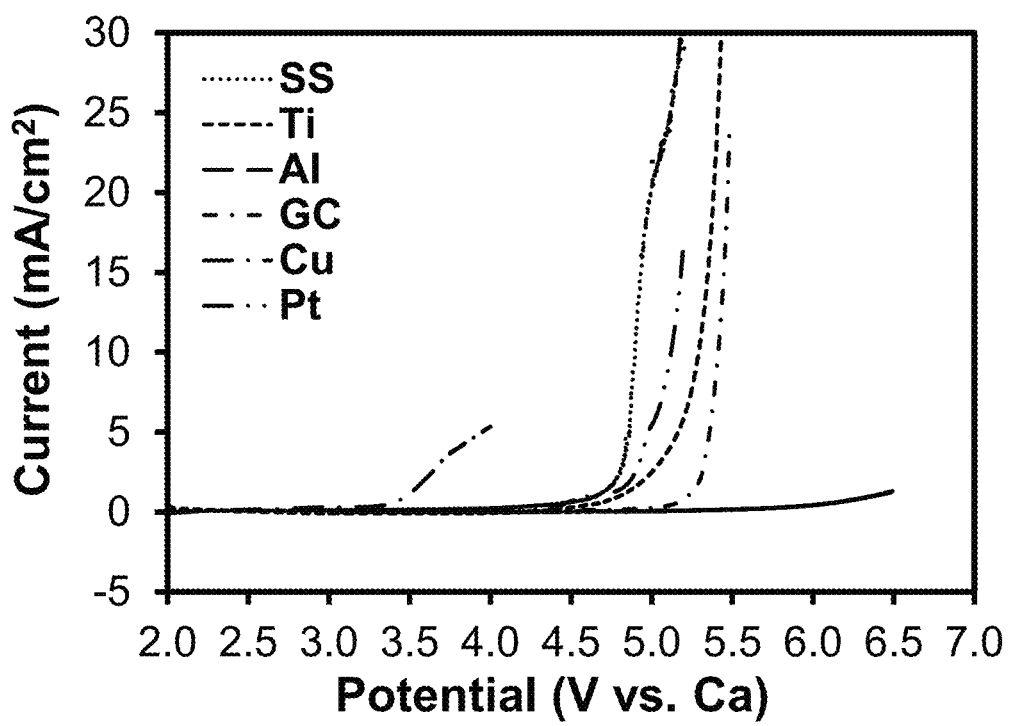
FIG. 31B shows linear sweep voltammetry using labeled material as working electrode.

As shown in FIG. 31B, the onset voltage for electrolyte/solvent decomposition exceeded 4.5 V vs a Ca metal reference for all electrodes tested excluding Cu. Glassy carbon and Al showed stabilities greater than 5.0 V which is higher than the voltage stability of DME solvent. These results suggest Ca-FPB partially decomposes at the surface of the electrode in a favorable manner to passivate the electrode surface against parasitic high voltage side reactions. At the same time the electrode is not passivated to Ca$^{2+}$ ions deposition and stripping.

Figure 32A:
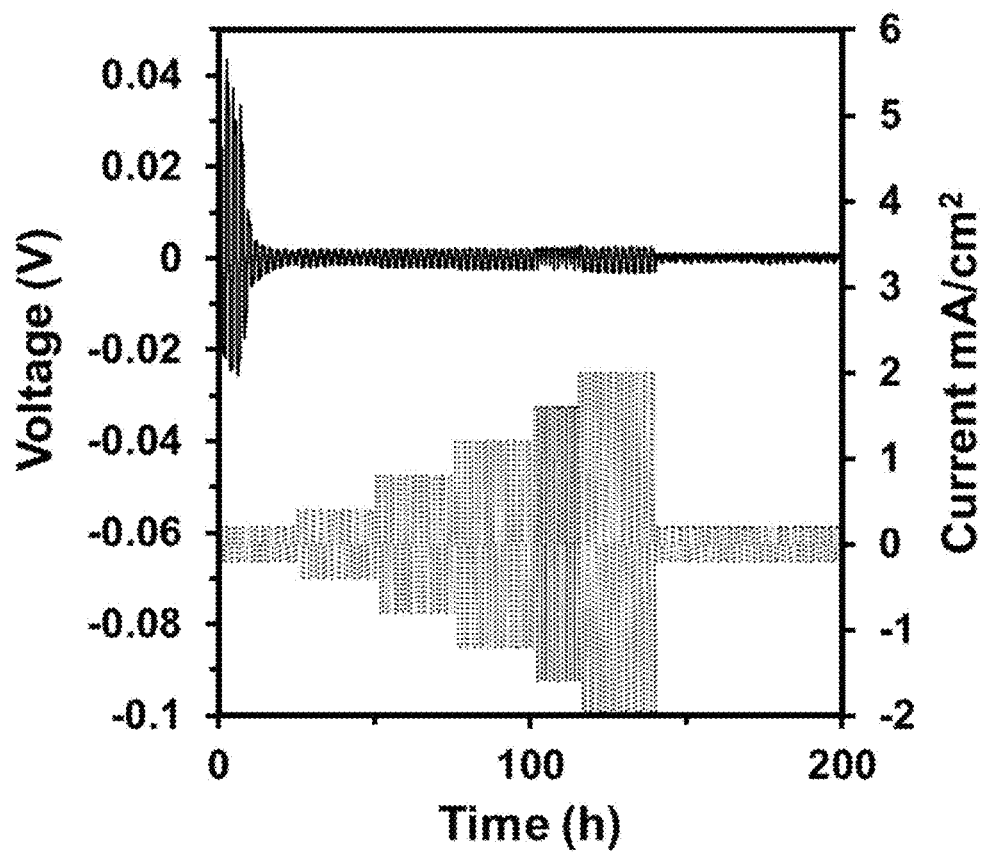
FIG. 32A shows battery tests with Ca-FPB using a Ca|Ca symmetric cell tested at varying currents galvanostatically with polarization curve showing 500-hour longevity of the cell.

The long-term cycling stability of the Ca-FPB electrolyte was tested in a symmetric Ca|Ca cell using excess Ca (10 mg) on each side. This symmetric type coin cell battery was tested galvanostatically at 0.2, 0.4, 0.8, 1.2, 1.6, and 2.0 mA/cm$^2$ current densities. As shown in FIG. 32A, the polarization of the cell was initially 60 mV but decreased to less than 5 mV within 10 cycles at 0.2 mA/cm$^2$. The polarization remained negligible (<5 mV) even at high current densities (2.0 mA/cm$^2$) consistent with the ultra-low overpotentials observed in CV. After high current density tests, the current was brought back to 0.2 mA/cm$^2$ for long term testing. The cell could cycle for 500 hours without failing which is among the longest running symmetric Ca|Ca type coin cells to date with the lowest cell polarization.

Figure 32B:
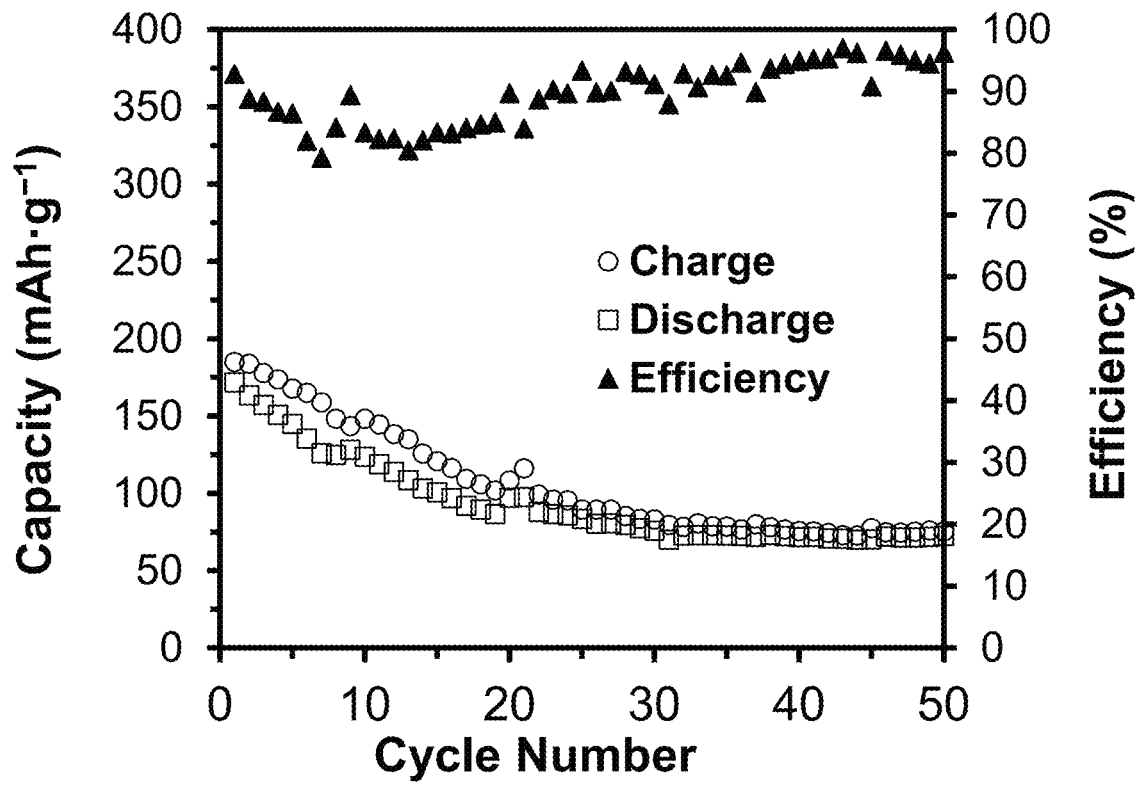
FIG. 32B shows a Ca|Fe(CN)$_6$ battery cycled between 2.0 and 3.5 V at 15 mA·g$^{-1}$.
Figure 32C:
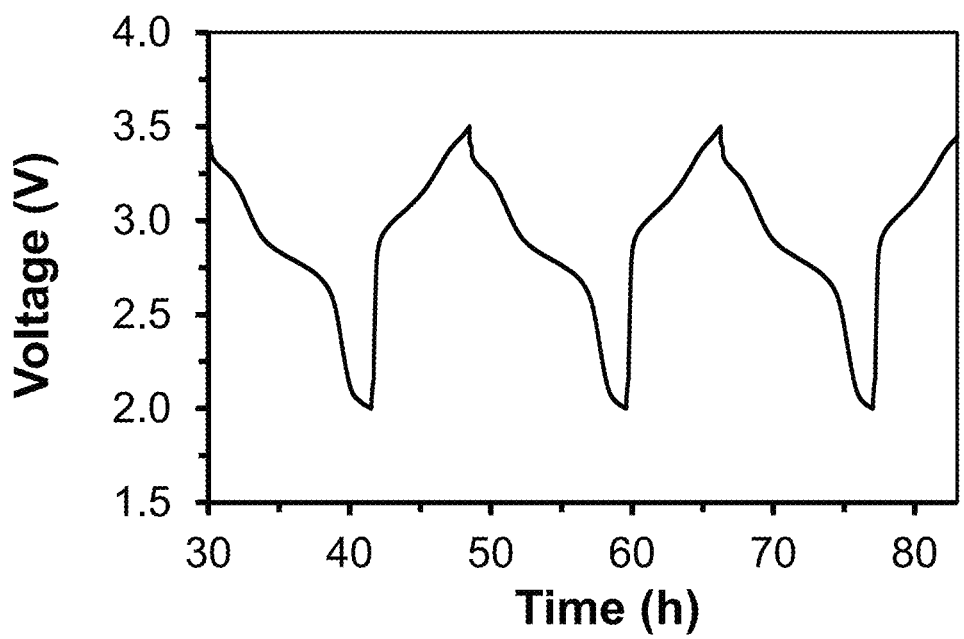
FIG. 32C shows the voltage profile of the battery cycle shown in FIG. 32B.

To further advance the study of the high voltage Ca(FPB)$_2$/DME electrolyte, it was of great interest to test a high voltage Ca metal battery. For this study (Prussian Blue) Na[Fe$^{III}$Fe$^{II}$(CN)$_6$] was chosen as a well-researched, high voltage Ca$^{2+}$ intercalation type host material. First the material was desodiated electrochemically by charging to 4.0 V vs. Na before use in the Ca battery. The desodiated Prussian Blue was paired with a Ca metal anode and 0.8 M Ca-FPB electrolyte with glass fiber separator to prepare a coin cell type battery. The cell was tested galvanostatically at 15 mA·g$^{-1}$ or approximately 0.1 C current density for charging and discharging. The lower and upper cut-off voltages were 2.0 V and 3.5 V, respectively. The average operating voltage of the cell was 3.0 V and it could deliver a high discharge capacity of 171 mAh·g$^{-1}$ in the first cycle (FIG. 32B). Upon charging a Coulombic efficiency of 92% was recorded for the first cycle and increased to as high as 94% in cycle 50. Reversible intercalation was confirmed by PXRD with characteristic peak shifting observed. The discharge and charge capacities decayed by 50% in 50 cycles. The decay mechanism was attributed to instability of the cathode upon initial cycling and the possibility of parasitic irreversible side reactions. Large amounts of fluorine (25%) were detected by EDS of the cathode after cycling indicative of SEI formation. It was evident from the comparison of the symmetric cell data that reversibility at the anode is optimal. The 0.8 M Ca-FPB electrolyte could evidently support the high voltage Fe$_2$(CN)$_6$ battery with capacity decay originating from deleterious cathode side reactions.

What is claimed is:
1. A salt of formula (Ia):

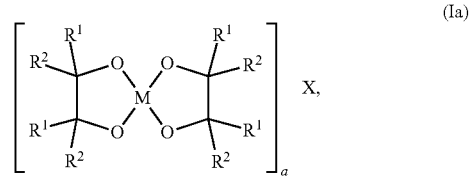

wherein:
each R$^1$ and R$^2$ are independently selected from the group consisting of H, F, a C$_1$-C$_{10}$ alkyl, a C$_1$-C$_{10}$ fluoroalkyl, and a phenyl that is optionally substituted with 1-5 substituents each independently selected from the group consisting of F, a C$_1$-C$_{10}$ alkyl, and a C$_1$-C$_{10}$ fluoroalkyl;
M is boron;
a is 1 or 2; and
X is magnesium.
2. An electrolyte comprising:
a solvent comprising an ether, an organic carbonate, a lactone, a ketone, a glyme, a nitrile, an aliphatic hydrocarbon solvent, an aromatic hydrocarbon solvent, an organic nitro solvent, an organosulfur compound, or combinations thereof; and a salt of formula (Ia):

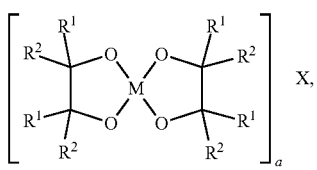

wherein:
each $R^1$ and $R^2$ are independently selected from the group consisting of H, F, a $C_1$-$C_{10}$ alkyl, a $C_1$-$C_{10}$ fluoroalkyl, and a phenyl that is optionally substituted with 1-5 substituents each independently selected from the group consisting of F, a $C_1$-$C_{10}$ alkyl, and a $C_1$-$C_{10}$ fluoroalkyl;
M is boron;
a is 1 or 2; and
X is magnesium, sodium, potassium, calcium, or zinc.

3. The electrolyte of claim 2, wherein X is magnesium.

4. The electrolyte of claim 2, wherein the solvent comprises tetrahydrofuran, 2-methyl tetrahydrofuran, dimethoxyethane, glyme, monoglyme, diglyme, triglyme, tetraglyme, diethoxyethane, diethylether, proglyme, ethyl diglyme, butyl diglyme, dimethylsulfoxide, dimethylsulfite, sulfolane, ethyl methyl sulfone, acetonitrile, hexane, toluene, nitromethane, 1-3 dioxalane, 1-4 dioxane, trimethyl phosphate, tri-ethyl phosphate, hexa-methyl-phosphoramide (HMPA), dimethyl glycol, ethylene glycol dimethyl ether, diethyl ether, or combinations thereof.

5. The electrolyte of claim 2, wherein the solvent comprises at least one of dimethoxyethane, diglyme, ethyl diglyme, or butyl diglyme.

6. The electrolyte of claim 2, wherein a concentration of the compound is from about 0.01 M to about 1 M.

7. The electrolyte of claim 6, wherein the concentration of the compound is about 0.5 M.

8. The electrolyte of claim 2, wherein the electrolyte has an anodic stability of greater than or equal to 2.0 Volts versus an alkali metal or alkaline earth metal which is the same as the alkali metal or alkaline earth metal of X in the compound of formula (Ia).

9. The electrolyte of claim 2, wherein the solution has an anodic stability of greater than or equal to 4.0 Volts versus magnesium.

10. The electrolyte of claim 2, wherein the electrolyte has a Coulombic efficiency greater than 70%.

11. The electrolyte of claim 2, wherein the electrolyte has a Coulombic efficiency greater than 95%.

12. A battery comprising:
the electrolyte of claim 2;
a cathode; and
an anode comprising an anode active material comprising a metal selected from the group consisting of an alkali metal, an alkaline earth metal, and zinc;
where the metal is the same as X in the compound of formula (Ia).

13. The battery of claim 12, wherein the cathode comprising an active material selected from the group consisting of sulfur, graphitic carbon, carbon fiber, glassy carbon, pyrolitic carbon, amorphous carbon, mesoporous carbon, carbon nanotubes, organic polymers, $Mo_6S_8$, $MnO_2$, CuS, $Cu_2S$, $Ag_2S$, $CrS_2$, $VOPO_4$, $TiS_2$, $V_2O_5$, $MgVO_3$, $MoS_2$, $MgV_2O_5$, $MoO_3$, $CuCr_2S_4$, $MgCr_2S_4$, $MgMn_2O_4$, $Mg_2MnO_4$, $MgFe_2(PO_4)_3$, $MgV_2(PO_4)_3$, $MgMnSiO_4$, $MgFe_2(PO_4)_2$, $Mg_{0.5}VPO_4F$, $TiP_2O_7$, $VP_2O_7$, and $FeF_3$.

* * * * *